(12) United States Patent
Judge et al.

(10) Patent No.: US 7,458,098 B2
(45) Date of Patent: *Nov. 25, 2008

(54) SYSTEMS AND METHODS FOR ENHANCING ELECTRONIC COMMUNICATION SECURITY

(75) Inventors: Paul Judge, Smyrna, GA (US); Guru Rajan, Duluth, GA (US)

(73) Assignee: Secure Computing Corporation, Alpharetta, GA (US)

( * ) Notice: Subject to any disclaimer, the term of this patent is extended or adjusted under 35 U.S.C. 154(b) by 844 days.

This patent is subject to a terminal disclaimer.

(21) Appl. No.: 10/094,211

(22) Filed: Mar. 8, 2002

(65) Prior Publication Data

US 2003/0172166 A1 Sep. 11, 2003

(51) Int. Cl.
*G06F 7/04* (2006.01)
*H04L 9/32* (2006.01)
*H04L 9/00* (2006.01)

(52) U.S. Cl. .............................. 726/23; 726/6; 726/27; 713/151; 713/187; 713/188

(58) Field of Classification Search ..................... 726/23
See application file for complete search history.

(56) References Cited

U.S. PATENT DOCUMENTS

| 4,289,930 A | 9/1981 | Connolly et al. |
| 4,384,325 A | 5/1983 | Slechta et al. |
| 4,386,416 A | 5/1983 | Giltner et al. |
| 4,532,588 A | 7/1985 | Foster |
| 4,713,780 A | 12/1987 | Schultz et al. |
| 4,754,428 A | 6/1988 | Schultz et al. |
| 4,837,798 A | 6/1989 | Cohen et al. |
| 4,853,961 A | 8/1989 | Pastor |
| 4,864,573 A | 9/1989 | Horsten |
| 4,951,196 A | 8/1990 | Jackson |
| 4,975,950 A | 12/1990 | Lentz |
| 4,979,210 A | 12/1990 | Nagata et al. |
| 5,008,814 A | 4/1991 | Mathur |
| 5,020,059 A | 5/1991 | Gorin et al. |
| 5,051,886 A | 9/1991 | Kawaguchi et al. |
| 5,054,096 A | 10/1991 | Beizer |

(Continued)

FOREIGN PATENT DOCUMENTS

CA 2564533 12/2005

(Continued)

OTHER PUBLICATIONS

Article entitled "MIMEsweeper defuses virus network, 'net mail bombs" by Avery, in *Info World*, May 20, 1996, vol. 12, No. 21, p. N1.

(Continued)

*Primary Examiner*—Longbit Chai
(74) *Attorney, Agent, or Firm*—Fish & Richardson P.C.

(57) ABSTRACT

The present invention is directed to systems and methods for enhancing electronic communication security. An electronic communication related to an application is received and stored. One or more risk assessments are made with respect to the received communication thereby generating a risk profile associated with the communication. The risk profile is analyzed with respect to data associated with previously received communications to determine if the received communication is anomalous. If the received communication is determined to be anomalous, an anomaly indicator signal is output.

64 Claims, 9 Drawing Sheets

U.S. PATENT DOCUMENTS

| | | |
|---|---|---|
| 5,105,184 A | 4/1992 | Pirani et al. |
| 5,119,465 A | 6/1992 | Jack et al. |
| 5,144,557 A | 9/1992 | Wang |
| 5,144,659 A | 9/1992 | Jones |
| 5,144,660 A | 9/1992 | Rose |
| 5,167,011 A | 11/1992 | Priest |
| 5,210,824 A | 5/1993 | Putz et al. |
| 5,210,825 A | 5/1993 | Kavaler |
| 5,235,642 A | 8/1993 | Wobber et al. |
| 5,239,466 A | 8/1993 | Morgan et al. |
| 5,247,661 A | 9/1993 | Hager et al. |
| 5,276,869 A | 1/1994 | Forrest et al. |
| 5,278,901 A | 1/1994 | Shieh et al. |
| 5,283,887 A | 2/1994 | Zachery |
| 5,293,250 A | 3/1994 | Okumura et al. |
| 5,313,521 A | 5/1994 | Torii et al. |
| 5,319,776 A | 6/1994 | Hile et al. |
| 5,355,472 A | 10/1994 | Lewis |
| 5,367,621 A | 11/1994 | Cohen et al. |
| 5,377,354 A | 12/1994 | Scannell et al. |
| 5,379,340 A | 1/1995 | Overend et al. |
| 5,379,374 A | 1/1995 | Ishizaki et al. |
| 5,404,231 A | 4/1995 | Bloomfield |
| 5,406,557 A | 4/1995 | Baudoin |
| 5,414,833 A | 5/1995 | Hershey et al. |
| 5,416,842 A | 5/1995 | Aziz |
| 5,418,908 A | 5/1995 | Keller et al. |
| 5,424,724 A | 6/1995 | Williams et al. |
| 5,479,411 A | 12/1995 | Klein |
| 5,481,312 A | 1/1996 | Cash et al. |
| 5,483,466 A | 1/1996 | Kawahara et al. |
| 5,485,409 A | 1/1996 | Gupta et al. |
| 5,495,610 A | 2/1996 | Shing et al. |
| 5,509,074 A | 4/1996 | Choudhury et al. |
| 5,511,122 A | 4/1996 | Atkinson |
| 5,513,126 A | 4/1996 | Harkins et al. |
| 5,513,323 A | 4/1996 | Williams et al. |
| 5,530,852 A | 6/1996 | Meske, Jr. et al. |
| 5,535,276 A | 7/1996 | Ganesan |
| 5,541,993 A | 7/1996 | Fan et al. |
| 5,544,320 A | 8/1996 | Konrad |
| 5,550,984 A | 8/1996 | Gelb |
| 5,550,994 A | 8/1996 | Tashiro et al. |
| 5,557,742 A | 9/1996 | Smaha et al. |
| 5,572,643 A | 11/1996 | Judson |
| 5,577,209 A | 11/1996 | Boyle et al. |
| 5,602,918 A | 2/1997 | Chen et al. |
| 5,606,668 A | 2/1997 | Shwed |
| 5,608,819 A | 3/1997 | Ikeuchi |
| 5,608,874 A | 3/1997 | Ogawa et al. |
| 5,619,648 A | 4/1997 | Canale et al. |
| 5,632,011 A | 5/1997 | Landfield et al. |
| 5,638,487 A | 6/1997 | Chigier |
| 5,644,404 A | 7/1997 | Hashimoto et al. |
| 5,657,461 A | 8/1997 | Harkins et al. |
| 5,673,322 A | 9/1997 | Pepe et al. |
| 5,675,507 A | 10/1997 | Bobo, II |
| 5,675,733 A | 10/1997 | Williams |
| 5,677,955 A | 10/1997 | Doggett et al. |
| 5,694,616 A | 12/1997 | Johnson et al. |
| 5,696,822 A | 12/1997 | Nachenberg |
| 5,706,442 A | 1/1998 | Anderson et al. |
| 5,708,780 A | 1/1998 | Levergood et al. |
| 5,708,826 A | 1/1998 | Ikeda et al. |
| 5,710,883 A | 1/1998 | Hong et al. |
| 5,727,156 A | 3/1998 | Herr-Hoyman et al. |
| 5,740,231 A | 4/1998 | Cohn et al. |
| 5,742,759 A | 4/1998 | Nessett et al. |
| 5,742,769 A | 4/1998 | Lee et al. |
| 5,745,574 A | 4/1998 | Muftic |
| 5,751,956 A | 5/1998 | Kirsch |
| 5,758,343 A | 5/1998 | Vigil et al. |
| 5,764,906 A | 6/1998 | Edelstein et al. |
| 5,768,528 A | 6/1998 | Stumm |
| 5,771,348 A | 6/1998 | Kubatzki et al. |
| 5,778,372 A | 7/1998 | Cordell et al. |
| 5,781,857 A | 7/1998 | Hwang et al. |
| 5,781,901 A | 7/1998 | Kuzma |
| 5,790,789 A | 8/1998 | Suarez |
| 5,790,790 A | 8/1998 | Smith et al. |
| 5,790,793 A | 8/1998 | Higley |
| 5,793,763 A | 8/1998 | Mayes et al. |
| 5,793,972 A | 8/1998 | Shane |
| 5,796,942 A | 8/1998 | Esbensen |
| 5,796,948 A | 8/1998 | Cohen |
| 5,801,700 A | 9/1998 | Ferguson |
| 5,805,719 A | 9/1998 | Pare, Jr. et al. |
| 5,812,398 A | 9/1998 | Nielsen |
| 5,812,776 A | 9/1998 | Gifford |
| 5,822,526 A | 10/1998 | Waskiewicz |
| 5,822,527 A | 10/1998 | Post |
| 5,826,013 A | 10/1998 | Nachenberg |
| 5,826,014 A | 10/1998 | Coley et al. |
| 5,826,022 A | 10/1998 | Nielsen |
| 5,826,029 A | 10/1998 | Gore, Jr. et al. |
| 5,835,087 A | 11/1998 | Herz et al. |
| 5,845,084 A | 12/1998 | Cordell et al. |
| 5,850,442 A | 12/1998 | Muftic |
| 5,855,020 A | 12/1998 | Kirsch |
| 5,860,068 A | 1/1999 | Cook |
| 5,862,325 A | 1/1999 | Reed et al. |
| 5,864,852 A | 1/1999 | Luotonen |
| 5,878,230 A | 3/1999 | Weber et al. |
| 5,884,033 A | 3/1999 | Duvall et al. |
| 5,892,825 A | 4/1999 | Mages et al. |
| 5,893,114 A | 4/1999 | Hashimoto et al. |
| 5,896,499 A | 4/1999 | McKelvey |
| 5,898,836 A | 4/1999 | Freivald et al. |
| 5,903,723 A | 5/1999 | Beck et al. |
| 5,911,776 A | 6/1999 | Guck |
| 5,923,846 A | 7/1999 | Gage et al. |
| 5,930,479 A | 7/1999 | Hall |
| 5,933,478 A | 8/1999 | Ozaki et al. |
| 5,933,498 A | 8/1999 | Schneck et al. |
| 5,937,164 A | 8/1999 | Mages et al. |
| 5,940,591 A | 8/1999 | Boyle et al. |
| 5,948,062 A | 9/1999 | Tzelnic et al. |
| 5,958,005 A | 9/1999 | Thorne et al. |
| 5,963,915 A | 10/1999 | Kirsch |
| 5,978,799 A | 11/1999 | Hirsch |
| 5,987,609 A | 11/1999 | Hasebe |
| 5,991,881 A | 11/1999 | Conklin et al. |
| 5,999,932 A | 12/1999 | Paul |
| 6,003,027 A | 12/1999 | Prager |
| 6,006,329 A | 12/1999 | Chi |
| 6,012,144 A | 1/2000 | Pickett |
| 6,014,651 A | 1/2000 | Crawford |
| 6,023,723 A | 2/2000 | McCormick et al. |
| 6,029,256 A | 2/2000 | Kouznetsov |
| 6,035,423 A | 3/2000 | Hodges et al. |
| 6,052,709 A | 4/2000 | Paul |
| 6,058,381 A | 5/2000 | Nelson |
| 6,058,482 A | 5/2000 | Liu |
| 6,061,448 A | 5/2000 | Smith et al. |
| 6,061,722 A | 5/2000 | Lipa et al. |
| 6,072,942 A | 6/2000 | Stockwell et al. |
| 6,092,114 A | 7/2000 | Shaffer et al. |
| 6,092,194 A | 7/2000 | Touboul |
| 6,094,277 A | 7/2000 | Toyoda |
| 6,094,731 A | 7/2000 | Waldin et al. |
| 6,104,500 A | 8/2000 | Alam et al. |
| 6,108,688 A | 8/2000 | Nielsen |
| 6,108,691 A | 8/2000 | Lee et al. |
| 6,108,786 A | 8/2000 | Knowlson |

| | | | | | | |
|---|---|---|---|---|---|---|
| 6,118,856 A | 9/2000 | Paarsmarkt et al. | | 6,701,440 B1 | 3/2004 | Kim et al. |
| 6,119,137 A | 9/2000 | Smith et al. | | 6,704,874 B1 | 3/2004 | Porras et al. |
| 6,119,142 A | 9/2000 | Kosaka | | 6,711,127 B1 * | 3/2004 | Gorman et al. ............ 370/230 |
| 6,119,230 A | 9/2000 | Carter | | 6,725,377 B1 | 4/2004 | Kouznetsov |
| 6,119,236 A | 9/2000 | Shipley | | 6,732,101 B1 | 5/2004 | Cook |
| 6,122,661 A | 9/2000 | Stedman et al. | | 6,732,157 B1 | 5/2004 | Gordon et al. |
| 6,141,695 A | 10/2000 | Sekiguchi et al. | | 6,735,703 B1 | 5/2004 | Kilpatrick et al. |
| 6,141,778 A | 10/2000 | Kane et al. | | 6,738,462 B1 | 5/2004 | Brunson |
| 6,145,083 A | 11/2000 | Shaffer et al. | | 6,742,124 B1 | 5/2004 | Kilpatrick et al. |
| 6,151,675 A | 11/2000 | Smith | | 6,742,128 B1 | 5/2004 | Joiner et al. |
| 6,161,130 A | 12/2000 | Horvitz et al. | | 6,754,705 B2 | 6/2004 | Joiner et al. |
| 6,185,689 B1 | 2/2001 | Todd, Sr. et al. | | 6,757,830 B1 | 6/2004 | Tarbotton et al. |
| 6,192,407 B1 | 2/2001 | Smith et al. | | 6,768,991 B2 | 7/2004 | Hearnden |
| 6,199,102 B1 | 3/2001 | Cobb | | 6,769,016 B2 | 7/2004 | Rothwell et al. |
| 6,202,157 B1 | 3/2001 | Brownlie et al. | | 6,775,657 B1 | 8/2004 | Baker |
| 6,219,714 B1 | 4/2001 | Inhwan et al. | | 6,792,546 B1 | 9/2004 | Shanklin et al. |
| 6,223,213 B1 | 4/2001 | Cleron et al. | | 6,892,178 B1 | 5/2005 | Zacharia |
| 6,249,575 B1 | 6/2001 | Heilmann et al. | | 6,892,179 B1 | 5/2005 | Zacharia |
| 6,249,807 B1 | 6/2001 | Shaw et al. | | 6,892,237 B1 | 5/2005 | Gai et al. |
| 6,260,043 B1 | 7/2001 | Puri et al. | | 6,895,385 B1 | 5/2005 | Zacharia |
| 6,269,447 B1 | 7/2001 | Maloney et al. | | 6,907,430 B2 | 6/2005 | Chong et al. |
| 6,269,456 B1 | 7/2001 | Hodges et al. | | 6,910,135 B1 | 6/2005 | Grainger |
| 6,272,532 B1 | 8/2001 | Feinleib | | 6,928,556 B2 * | 8/2005 | Black et al. ................. 713/400 |
| 6,275,942 B1 | 8/2001 | Bernhard et al. | | 6,941,348 B2 | 9/2005 | Petry et al. |
| 6,279,113 B1 | 8/2001 | Vaidya | | 6,941,467 B2 | 9/2005 | Judge et al. |
| 6,279,133 B1 | 8/2001 | Vafai et al. | | 6,968,461 B1 * | 11/2005 | Lucas et al. ................... 726/22 |
| 6,282,565 B1 | 8/2001 | Shaw et al. | | 2001/0049793 A1 | 12/2001 | Sugimoto |
| 6,285,991 B1 | 9/2001 | Powar | | 2002/0004902 A1 | 1/2002 | Toh et al. |
| 6,289,214 B1 | 9/2001 | Backstrom | | 2002/0016910 A1 | 2/2002 | Wright et al. |
| 6,298,445 B1 | 10/2001 | Shostack et al. | | 2002/0023140 A1 | 2/2002 | Hile et al. |
| 6,301,668 B1 | 10/2001 | Gleichauf et al. | | 2002/0026591 A1 | 2/2002 | Hartley et al. |
| 6,304,898 B1 | 10/2001 | Shiigi | | 2002/0032871 A1 | 3/2002 | Malan et al. |
| 6,304,973 B1 | 10/2001 | Williams | | 2002/0035683 A1 | 3/2002 | Kaashoek et al. |
| 6,311,207 B1 | 10/2001 | Mighdoll et al. | | 2002/0042876 A1 | 4/2002 | Smith |
| 6,317,829 B1 | 11/2001 | Van Oorschot | | 2002/0046041 A1 | 4/2002 | Lang |
| 6,320,948 B1 | 11/2001 | Heilmann et al. | | 2002/0049853 A1 | 4/2002 | Chu et al. |
| 6,321,267 B1 | 11/2001 | Donaldson | | 2002/0078382 A1 | 6/2002 | Sheikh et al. |
| 6,324,569 B1 | 11/2001 | Ogilvie et al. | | 2002/0087882 A1 | 7/2002 | Schneier et al. |
| 6,324,647 B1 | 11/2001 | Bowman-Amuah | | 2002/0095492 A1 | 7/2002 | Kaashoek et al. |
| 6,324,656 B1 | 11/2001 | Gleichauf et al. | | 2002/0112185 A1 | 8/2002 | Hodges |
| 6,330,589 B1 | 12/2001 | Kennedy | | 2002/0116627 A1 * | 8/2002 | Tarbotton et al. ............ 713/200 |
| 6,347,374 B1 | 2/2002 | Drake et al. | | 2002/0120853 A1 | 8/2002 | Tyree |
| 6,353,886 B1 | 3/2002 | Howard et al. | | 2002/0133365 A1 | 9/2002 | Grey et al. |
| 6,363,489 B1 | 3/2002 | Comay et al. | | 2002/0138416 A1 | 9/2002 | Lovejoy et al. |
| 6,370,648 B1 | 4/2002 | Diep | | 2002/0138755 A1 | 9/2002 | Ko |
| 6,373,950 B1 | 4/2002 | Rowney | | 2002/0138759 A1 | 9/2002 | Dutta |
| 6,385,655 B1 | 5/2002 | Smith et al. | | 2002/0138762 A1 | 9/2002 | Horne |
| 6,393,465 B2 | 5/2002 | Leeds | | 2002/0143963 A1 | 10/2002 | Converse et al. |
| 6,393,568 B1 | 5/2002 | Ranger et al. | | 2002/0147734 A1 | 10/2002 | Shoup et al. |
| 6,405,318 B1 | 6/2002 | Rowland | | 2002/0152399 A1 | 10/2002 | Smith |
| 6,442,588 B1 | 8/2002 | Clark et al. | | 2002/0165971 A1 | 11/2002 | Baron |
| 6,442,686 B1 | 8/2002 | McArdle et al. | | 2002/0169954 A1 | 11/2002 | Bandini et al. |
| 6,453,345 B2 | 9/2002 | Trcka et al. | | 2002/0172367 A1 | 11/2002 | Mulder et al. |
| 6,460,141 B1 | 10/2002 | Olden | | 2002/0178227 A1 | 11/2002 | Matsa et al. |
| 6,470,086 B1 | 10/2002 | Smith | | 2002/0178383 A1 | 11/2002 | Hrabik et al. |
| 6,487,599 B1 | 11/2002 | Smith et al. | | 2002/0188864 A1 | 12/2002 | Jackson |
| 6,487,666 B1 | 11/2002 | Shanklin et al. | | 2002/0194469 A1 | 12/2002 | Dominique et al. |
| 6,502,191 B1 | 12/2002 | Smith et al. | | 2002/0199095 A1 | 12/2002 | Bandini et al. |
| 6,516,411 B2 | 2/2003 | Smith | | 2003/0005326 A1 | 1/2003 | Flemming |
| 6,519,703 B1 | 2/2003 | Joyce | | 2003/0009554 A1 | 1/2003 | Burch et al. |
| 6,539,430 B1 | 3/2003 | Humes | | 2003/0009693 A1 | 1/2003 | Brock et al. |
| 6,546,416 B1 | 4/2003 | Kirsch | | 2003/0009696 A1 | 1/2003 | Bunker et al. |
| 6,546,493 B1 | 4/2003 | Magdych et al. | | 2003/0009699 A1 | 1/2003 | Gupta et al. |
| 6,550,012 B1 | 4/2003 | Villa et al. | | 2003/0014664 A1 | 1/2003 | Hentunen |
| 6,574,737 B1 | 6/2003 | Kingsford et al. | | 2003/0023692 A1 | 1/2003 | Moroo |
| 6,578,025 B1 | 6/2003 | Pollack et al. | | 2003/0023695 A1 | 1/2003 | Kobata et al. |
| 6,609,196 B1 | 8/2003 | Dickinson, III et al. | | 2003/0023873 A1 | 1/2003 | Ben-Itzhak |
| 6,650,890 B1 | 11/2003 | Irlam et al. | | 2003/0023874 A1 * | 1/2003 | Prokupets et al. ........... 713/201 |
| 6,654,787 B1 | 11/2003 | Aronson et al. | | 2003/0023875 A1 | 1/2003 | Hursey et al. |
| 6,675,153 B1 | 1/2004 | Cook et al. | | 2003/0028803 A1 | 2/2003 | Bunker et al. |
| 6,681,331 B1 | 1/2004 | Munson et al. | | 2003/0033516 A1 | 2/2003 | Howard et al. |
| 6,687,687 B1 | 2/2004 | Smadja | | 2003/0033542 A1 | 2/2003 | Goseva-Popstojanova et al. |
| 6,697,950 B1 | 2/2004 | Ko | | 2003/0041264 A1 * | 2/2003 | Black et al. ................. 713/201 |

| | | |
|---|---|---|
| 2003/0051026 A1 | 3/2003 | Carter et al. |
| 2003/0051163 A1 | 3/2003 | Bidaud |
| 2003/0051168 A1 | 3/2003 | King et al. |
| 2003/0055931 A1 | 3/2003 | Cravo De Almeida et al. |
| 2003/0061506 A1 | 3/2003 | Cooper et al. |
| 2003/0065943 A1 | 4/2003 | Geis et al. |
| 2003/0084280 A1 | 5/2003 | Bryan et al. |
| 2003/0084320 A1 | 5/2003 | Tarquini et al. |
| 2003/0084323 A1 | 5/2003 | Gales |
| 2003/0084347 A1 | 5/2003 | Luzzatto |
| 2003/0088792 A1 | 5/2003 | Card et al. |
| 2003/0093667 A1 | 5/2003 | Dutta et al. |
| 2003/0093695 A1 | 5/2003 | Dutta |
| 2003/0093696 A1 | 5/2003 | Sugimoto |
| 2003/0095555 A1 | 5/2003 | McNamara et al. |
| 2003/0097439 A1 | 5/2003 | Strayer et al. |
| 2003/0097564 A1 | 5/2003 | Tewari et al. |
| 2003/0105976 A1 | 6/2003 | Copeland, III |
| 2003/0110392 A1 | 6/2003 | Aucsmith et al. |
| 2003/0110396 A1 | 6/2003 | Lewis et al. |
| 2003/0115485 A1 | 6/2003 | Milliken |
| 2003/0115486 A1 | 6/2003 | Choi et al. |
| 2003/0123665 A1 | 7/2003 | Dunstan et al. |
| 2003/0126464 A1 | 7/2003 | McDaniel et al. |
| 2003/0126472 A1 | 7/2003 | Banzhof |
| 2003/0135749 A1 | 7/2003 | Gales et al. |
| 2003/0140137 A1 | 7/2003 | Joiner et al. |
| 2003/0140250 A1 | 7/2003 | Taninaka et al. |
| 2003/0145212 A1 | 7/2003 | Crumly |
| 2003/0145225 A1 | 7/2003 | Bruton, III et al. |
| 2003/0145226 A1 | 7/2003 | Bruton, III et al. |
| 2003/0149887 A1 | 8/2003 | Yadav |
| 2003/0149888 A1 | 8/2003 | Yadav |
| 2003/0154393 A1 | 8/2003 | Young |
| 2003/0154399 A1 | 8/2003 | Zuk et al. |
| 2003/0154402 A1 | 8/2003 | Pandit et al. |
| 2003/0158905 A1 | 8/2003 | Petry et al. |
| 2003/0159069 A1 | 8/2003 | Choi et al. |
| 2003/0159070 A1 | 8/2003 | Mayer et al. |
| 2003/0167402 A1 | 9/2003 | Stolfo et al. |
| 2003/0172166 A1 | 9/2003 | Judge et al. |
| 2003/0172167 A1 | 9/2003 | Judge et al. |
| 2003/0172289 A1 | 9/2003 | Soppera |
| 2003/0172291 A1 | 9/2003 | Judge et al. |
| 2003/0172292 A1 | 9/2003 | Judge |
| 2003/0172294 A1 | 9/2003 | Judge |
| 2003/0172301 A1 | 9/2003 | Judge et al. |
| 2003/0172302 A1 | 9/2003 | Judge et al. |
| 2003/0187996 A1 | 10/2003 | Cardina et al. |
| 2003/0233328 A1 | 12/2003 | Scott et al. |
| 2004/0015554 A1 | 1/2004 | Wilson |
| 2004/0025044 A1 | 2/2004 | Day |
| 2004/0054886 A1 | 3/2004 | Dickinson et al. |
| 2004/0058673 A1 | 3/2004 | Irlam et al. |
| 2004/0059811 A1 | 3/2004 | Sugauchi et al. |
| 2004/0088570 A1 | 5/2004 | Roberts et al. |
| 2004/0111531 A1 | 6/2004 | Staniford et al. |
| 2004/0139160 A1 | 7/2004 | Wallace et al. |
| 2004/0139334 A1 | 7/2004 | Wiseman |
| 2004/0177120 A1 | 9/2004 | Kirsch |
| 2004/0205135 A1 | 10/2004 | Hallam-Baker et al. |
| 2005/0021738 A1 | 1/2005 | Goeller et al. |
| 2005/0052998 A1 | 3/2005 | Oliver et al. |
| 2005/0065810 A1 | 3/2005 | Bouron |
| 2005/0102366 A1 | 5/2005 | Kirsch |
| 2005/0262209 A1 | 11/2005 | Yu |
| 2005/0262210 A1 | 11/2005 | Yu |
| 2006/0036727 A1 | 2/2006 | Kurapati et al. |
| 2006/0042483 A1 | 3/2006 | Work et al. |
| 2006/0095404 A1 | 5/2006 | Adelman et al. |
| 2006/0123083 A1 | 6/2006 | Goutte et al. |
| 2006/0212925 A1 | 9/2006 | Shull et al. |
| 2006/0212930 A1 | 9/2006 | Shull et al. |
| 2006/0212931 A1 | 9/2006 | Shull et al. |
| 2006/0230039 A1 | 10/2006 | Shull et al. |
| 2006/0253458 A1 | 11/2006 | Dixon et al. |

FOREIGN PATENT DOCUMENTS

| | | |
|---|---|---|
| EP | 0375138 A2 | 6/1990 |
| EP | 0413537 A2 | 2/1991 |
| EP | 0420779 A2 | 4/1991 |
| EP | 0720333 A2 | 7/1996 |
| EP | 0838774 A2 | 4/1998 |
| EP | 0869652 A2 | 10/1998 |
| EP | 0907120 A2 | 4/1999 |
| EP | 1326376 | 7/2003 |
| EP | 1271846 | 7/2005 |
| GB | 2271002 A | 3/1994 |
| JP | 18350870 | 12/2006 |
| KR | 2006-0012137 | 2/2006 |
| KR | 1020060041934 | 5/2006 |
| WO | WO 96/35994 A1 | 11/1996 |
| WO | WO 99/05814 A2 | 2/1999 |
| WO | WO 99/33188 A2 | 7/1999 |
| WO | WO 99/37066 A1 | 7/1999 |
| WO | WO 00/42748 A1 | 7/2000 |
| WO | WO 01/17165 A2 | 3/2001 |
| WO | WO 01/50691 A2 | 7/2001 |
| WO | WO 01/76181 A2 | 11/2001 |
| WO | WO 02/13469 A2 | 2/2002 |
| WO | WO 02/13489 A2 | 2/2002 |
| WO | WO 02/075547 A1 | 9/2002 |
| WO | WO 02/091706 A1 | 11/2002 |
| WO | WO 2004/061703 | 7/2004 |
| WO | WO 2004081734 | 9/2004 |
| WO | WO 2005116851 | 12/2005 |

OTHER PUBLICATIONS

Article entitled "Stomping out mail viruses" by Wilkerson, in *PC Week*, Jul. 15, 1996, p. N8.

Article entitled "Securing Electronic Mail Systems" by Serenelli et. al., in *Communications-Fusing Command Control and Intelligence: MILCOM '92*, 1992, pp. 677-680.

Article entitled "Integralis' Minesweeper defuses E-mail bombs" by Kramer et. al., in *PC Week*, Mar. 18, 1996, pp. N17-N23.

Article entitled "A Toolkit and Methods for Internet Firewalls" by Ranum et. al., in *Proc. of USENIX Summer 1994 Technical Conference*, Jun. 6-10, 1994, pp. 37-44.

Article entitled "Firewall Systems: The Next Generation" by McGhie, in *Integration Issues in Large Commercial Media Delivery Systems: Proc. of SPIE-The International Society for Optical Engineering*, Oct. 23-24, 1995, pp. 270-281.

Article entitled "Design of the TTI Prototype Trusted Mail Agent" by Rose et. al., in *Computer Message Systems-85: Proc. of the IFIP TC 6 International Symposium on Computer Message Systems*, Sep. 5-7, 1985, pp. 377-399.

Article entitled "Designing an Academic Firewall: Policy, Practice, and Experience with SURF" by Greenwald et. al., in *Proc. of the 1996 Symposium on Network and Distributed Systems Security*, 1996, pp. 1-14.

Article entitled "X Through the Firewall, and Other Application Relays" by Treese et. al. in *Proc. of the USENIX Summer 1993 Technical Conference*, Jun. 21-25, 1993, pp. 87-99.

Article entitled "Firewalls For Sale" by Bryan, in *BYTE*, Apr. 1995, pp. 99-104.

Article entitled "A DNS Filter and Switch for Packet-filtering Gateways", by Cheswick et. al., in *Proc. of the Sixth Annual USENIX Security Symposium: Focusing on Applications of Cryptography*, Jul. 22-25, 1996, pp. 15-19.

Article entitled "Safe Use of X Window System Protocol Across A Firewall" by Kahn, in *Proc. of the Fifth USENIX UNIX Security Symposium*, Jun. 5-7, 1995, pp. 105-116.

Article entitled "Automating the OSI to Internet Management Conversion Through the Use of an Object-Oriented Platform" by Pavlou et. al., in *Proc. of the IFIP TC6/WG6.4 International Conference on*

*Advanced Information Processing Techniques for LAN and MAN Management*, Apr. 7-9, 1993, pp. 245-260.
Article entitled "A Secure Email Gateway (Building an RCAS External Interface)" by Smith, in *Tenth Annual Computer Security Applications Conference*, Dec. 5-9, 1994, pp. 202-211.
Article entitled "Secure External References in Multimedia Email Messages" by Wiegel, in *3rd ACM Conference on Computer and Communications Security*, Mar. 14-16, 1996, pp. 11-18.
Memo entitled "SOCKS Protocol Version 5" by Leech et. al., in *Standards Track*, Mar. 1996, pp. 1-9.
Article entitled "Securing the Web: fire walls, proxy servers, and data driven attacks" by Farrow in *InfoWorld*, Jun. 19, 1995, vol. 17, No. 25, p. 103.
U.S. Appl. No. 10/093,553, filed Mar. 8, 2002, Judge et al.
U.S. Appl. No. 10/094,266, filed Mar. 8, 2002, Judge et al.
Website: Technical Focus—Products—Entegrity AssureAccess. www2.entegrity.com.
Website: Create Secure Internet Communication Channels—Atabok Homepage. www.atabok.com.
Website: ATABOK VCNMAIL™ Secure Email Solution—Atabok Related Produces. www.atabok.com.
Website: ATABOK VCN Auto-Exchange™—Atabok Related Produces. www.atabok.com.
Website: Controlling Digital Assets Is A Paramount Need For All Business—Atabok Related Produces. www.atabok.com.
Website: Control Your Confidential Communications with ATABOK—Atabok Related Produces. www.atabok.com.
Website: Entrust Entelligence—Entrust Homepage. www.entrust.com.
Website: E-mail Plug-in—Get Technical / Interoperability—Entrust Entelligence. www.entrust.com.
Website: E-mail Plug-in—Get Technical / System Requirements—Entrust Entelligence. www.entrust..com.
Website: E-mail Plug-in—Features and Benefits—Entrust Entelligence. www.entrust.com.
Website: Internet Filtering Software- Internet Manager Homepage. www.eironsw.com.
Website: ESKE—Email with Secure Key Exchange—ESKE. www.danu.ie.
Website: Terminet—ESKE. www.danu.ie.
Website: Baltimore Focus on e-Security—Baltimore Technologies. www.baltimore.com.
Website: Go Secure! for Microsoft Exchange—Products/Services—Verisign, Inc. www.verisign.com.
Article entitled "An Example-Based Mapping Method for Text Categorization and Retrieval" by Yang et. al., in *ACM Transactions on Information Systems*, Jul. 1994, vol. 12, No. 3, pp. 252-277.
Article entitled "A Comparison of Two Learning Algorithms for Text Categorization" by Lewis et. al., in *Third Annual Symposium on Document Analysis and Information Retrieval*, Apr. 11-13, 1994, pp. 81-92.
Article entitled "Learning Limited Dependence Bayesian Classifiers" by Sahami, in *Proceedings of the Second International Conference on Knowledge Discovery and Data Mining*, 1996, pp. 335-338.
Article entitled "An Evaluation of Phrasal and Clustered Representations on a Text Categorization Task" by Lewis, in *15th Ann Int'l SIGIR*, Jun. 1992, pp. 37-50.
Book entitled *Machine Learning* by Mitchell, 1997, pp. 180-184.
Article entitled "Learning Rules that Classify E-mail" by Cohen, pp. 1-8, date unknown.
Article entitled "Hierarchically classifying documents using very few words" by Koller et. al., in *Proceedings of the Fourteenth International Conference on Machine Learning*, 1997.
Article entitled "Classification of Text Documents" by Li et. al., in *The Computer Journal*, vol. 41, No. 8, 1998, pp. 537-546.
Article entitled "Issues when designing filters in messaging systems" by Palme et. al., in 19 *Computer Communications*, 1996, pp. 95-101.
Article entitled "Text Categorization with Support Vector Machines: Learning with Many Relevant Features" by Joachins in *Machine Learning: ECML-98*, Apr. 1998, pp. 1-14.
Article entitled "Hierarchical Bayesian Clustering for Automatic Text Classification" by Iwayama et. al. in *Natural Language*, pp. 1322-1327, date unknown.
Article entitled "Smokey: Automatic Recognition of Hostile Messages" by Spertus in *Innovative Applications* 1997, pp. 1058-1065.
Article entitled "A Comparison of Classifiers and Document Representations for the Routing Problem" by Schutze, date unknown.
Article entitled "CAFE: A Conceptual Model for Managing Information in Electronic Mail" by Takkinen et. al. in *Proc. 31st Annual Hawaii International Conference on System Sciences*, 1998, pp. 44-53.
Article entitled "A Comparative Study on Feature Selection in Text Categorization" by Yang et. al, date unknown.
Article entitled "Spam!" by Cranor et. al. in *Communications Of The ACM*, vol. 41, No. 8, Aug. 1998, pp. 74-83.
Article entitled "Sendmail And Spam" by LeFebvre in *Performance Computing*, Aug. 1998, pp. 55-58.
Article entitled "Implementing a Generalized Tool for Network Monitoring" by Ranum et. al. in *LISA XI*, Oct. 26-31, 1997, pp. 1-8.
Article entitled "Method For Automatic Contexual Transposition Upon Receipt Of Item Of Specified Criteria" printed Feb. 1994 in *IBM Technical Disclosure Bulletin*, vol. 37, No. 2B, p. 333.
Article entitled "Toward Optimal Feature Selection" by Koller et. al., in *Machine Learning: Proc. of the Thirteenth International Conference*, 1996.
Website: Create Secure Internet Communication Channels—Atabok Homepage. www.atabok.com, date unknown.
Website: ATABOK VCNMAIL™ Secure Email Solution—Atabok Related Produces. www.atabok.com, date unknown.
Website: ATABOK VCN Auto-Exchange™—Atabok Related Produces. www.atabok.com, date unknown.
Website: Controlling Digital Assets Is A Paramount Need For All Business—Atabok Related Produces. www.atabok.com, date unknown.
Website: Control Your Confidential Communications with ATABOK—Atabok Related Produces. www.atabok.com, date unknown.
Website: Entrust Entelligence—Entrust Homepage. www.entrust.com, date unknown.
Website: E-mail Plug-in—Get Technical / Interoperability—Entrust Entelligence. www.entrust.com, date unknown.
Website: E-mail Plug-in—Get Technical / System Requirements—Entrust Entelligence. www.entrust.com, date unknown.
Website: E-mail Plug-in—Features and Benefits—Entrust Entelligence. www.entrust.com, date unknown.
Website: Internet Filtering Software- Internet Manager Homepage. www.elronsw.com, date unknown.
Website: ESKE—Email with Secure Key Exchange—ESKE. www.danu.ie, date unknown.
Website: Terminet—ESKE. www.danu.ie, date unknown.
Website: Baltimore Focus on e-Security—Baltimore Technologies. www.baltimore.com, date unknown.
Website: Go Secure! for Microsoft Exchange—Products/Services—Verisign, Inc. www.verisign.com, date unknown.
PCT/US2008/051865 International Search Report, Jun. 4, 2008.
PCT/US2008/051869 International Search Report, Jun. 5, 2008.

* cited by examiner

SYSTEMS AND METHODS FOR ENHANCING ELECTRONIC COMMUNICATION SECURITY

CROSS-REFERENCE TO RELATED PATENT APPLICATIONS

This application is related to commonly assigned U.S. patent applications entitled "Systems and Methods for Adaptive Message Interrogation through Multiple Queues" and "Systems and Methods for Anomaly Detection in Patterns of Monitored Communications", assigned respectively Ser. Nos. 10/093,553 and 10/094,266, filed on Mar. 8, 2002 and incorporated herein by reference.

BACKGROUND

The present invention is directed to systems and methods for enhancing security associated with electronic communications. More specifically, without limitation, the present invention relates to computer-based systems and methods for assessing security risks associated with electronic communications transmitted over a communications network.

The Internet is a global network of connected computer networks. Over the last several years, the Internet has grown in significant measure. A large number of computers on the Internet provide information in various forms. Anyone with a computer connected to the Internet can potentially tap into this vast pool of information.

The information available via the Internet encompasses information available via a variety of types of application layer information servers such as SMTP (simple mail transfer protocol), POP3 (Post Office Protocol), GOPHER (RFC 1436), WAIS, HTTP (Hypertext Transfer Protocol, RFC 2616) and FTP (file transfer protocol, RFC 1123).

One of the most wide spread method of providing information over the Internet is via the World Wide Web (the Web). The Web consists of a subset of the computers connected to the Internet; the computers in this subset run Hypertext Transfer Protocol (HTTP) servers (Web servers). Several extensions and modifications to HTTP have been proposed including, for example, an extension framework (RFC 2774) and authentication (RFC 2617). Information on the Internet can be accessed through the use of a Uniform Resource Identifier (URI, RFC 2396). A URI uniquely specifies the location of a particular piece of information on the Internet. A URI will typically be composed of several components. The first component typically designates the protocol by which the address piece of information is accessed (e.g., HTTP, GOPHER, etc.). This first component is separated from the remainder of the URI by a colon (':'). The remainder of the URI will depend upon the protocol component. Typically, the remainder designates a computer on the Internet by name, or by IP number, as well as a more specific designation of the location of the resource on the designated computer. For instance, a typical URI for an HTTP resource might be:

http://www.server.com/dir1/dir2/resource.htm where http is the protocol, www.server.com is the designated computer and /dir1/dir2/resouce.htm designates the location of the resource on the designated computer. The term URI includes Uniform Resource Names (URN's) including URN's as defined according to RFC 2141.

Web servers host information in the form of Web pages; collectively the server and the information hosted are referred to as a Web site. A significant number of Web pages are encoded using the Hypertext Markup Language (HTML) although other encodings using eXtensible Markup Language (XML) or XHTML. The published specifications for these languages are incorporated by reference herein; such specifications are available from the World Wide Web Consortium and its Web site (http://www.w3c.org). Web pages in these formatting languages may include links to other Web pages on the same Web site or another. As will be known to those skilled in the art, Web pages may be generated dynamically by a server by integrating a variety of elements into a formatted page prior to transmission to a Web client. Web servers, and information servers of other types, await requests for the information from Internet clients.

Client software has evolved that allows users of computers connected to the Internet to access this information. Advanced clients such as Netscape's Navigator and Microsoft's Internet Explorer allow users to access software provided via a variety of information servers in a unified client environment. Typically, such client software is referred to as browser software.

Electronic mail (e-mail) is another wide spread application using the Internet. A variety of protocols are often used for e-mail transmission, delivery and processing including SMTP and POP3 as discussed above. These protocols refer, respectively, to standards for communicating e-mail messages between servers and for server-client communication related to e-mail messages. These protocols are defined respectively in particular RFC's (Request for Comments) promulgated by the IETF (Internet Engineering Task Force). The SMTP protocol is defined in RFC 821, and the POP3 protocol is defined in RFC 1939.

Since the inception of these standards, various needs have evolved in the field of e-mail leading to the development of further standards including enhancements or additional protocols. For instance, various enhancements have evolved to the SMTP standards leading to the evolution of extended SMTP. Examples of extensions may be seen in (1) RFC 1869 that defines a framework for extending the SMTP service by defining a means whereby a server SMTP can inform a client SMTP as to the service extensions it supports and in (2) RFC 1891 that defines an extension to the SMTP service, which allows an SMTP client to specify (a) that delivery status notifications (DSNs) should be generated under certain conditions, (b) whether such notifications should return the contents of the message, and (c) additional information, to be returned with a DSN, that allows the sender to identify both the recipient(s) for which the DSN was issued, and the transaction in which the original message was sent.

In addition, the IMAP protocol has evolved as an alternative to POP3 that supports more advanced interactions between e-mail servers and clients. This protocol is described in RFC 2060.

The various standards discussed above by reference to particular RFC's are hereby incorporated by reference herein for all purposes. These RFC's are available to the public through the IETF and can be retrieved from its Web site (http://www.ietf.org/rfc.html). The specified protocols are not intended to be limited to the specific RFC's quoted herein above but are intended to include extensions and revisions thereto. Such extensions and/or revisions may or may not be encompassed by current and/or future RFC's.

A host of e-mail server and client products have been developed in order to foster e-mail communication over the Internet. E-mail server software includes such products as sendmail-based servers, Microsoft Exchange, Lotus Notes Server, and Novell GroupWise; sendmail-based servers refer to a number of variations of servers originally based upon the sendmail program developed for the UNIX operating systems. A large number of e-mail clients have also been developed that allow a user to retrieve and view e-mail messages from a server; example products include Microsoft Outlook, Microsoft Outlook Express, Netscape Messenger, and Eudora. In addition, some e-mail servers, or e-mail servers in conjunction with a Web server, allow a Web browser to act as an e-mail client using the HTTP standard.

As the Internet has become more widely used, it has also created new risks for corporations. Breaches of computer security by hackers and intruders and the potential for compromising sensitive corporate information are a very real and serious threat. Organizations have deployed some or all of the following security technologies to protect their networks from Internet attacks:

Firewalls have been deployed at the perimeter of corporate networks. Firewalls act as gatekeepers and allow only authorized users to access a company network. Firewalls play an important role in controlling traffic into networks and are an important first step to provide Internet security.

Intrusion detection systems (IDS) are being deployed throughout corporate networks. While the firewall acts as a gatekeeper, IDS act like a video camera. IDS monitor network traffic for suspicious patterns of activity, and issue alerts when that activity is detected. IDS proactively monitor your network 24 hours a day in order to identify intruders within a corporate or other local network.

Firewall and IDS technologies have helped corporations to protect their networks and defend their corporate information assets. However, as use of these devices has become widespread, hackers have adapted and are now shifting their point-of-attack from the network to Internet applications. The most vulnerable applications are those that require a direct, "always-open" connection with the Internet such as web and e-mail. As a result, intruders are launching sophisticated attacks that target security holes within these applications.

Many corporations have installed a network firewall, as one measure in controlling the flow of traffic in and out of corporate computer networks, but when it comes to Internet application communications such as e-mail messages and Web requests and responses, corporations often allow employees to send and receive from or to anyone or anywhere inside or outside the company. This is done by opening a port, or hole in their firewall (typically, port 25 for e-mail and port 80 for Web), to allow the flow of traffic. Firewalls do not scrutinize traffic flowing through this port. This is similar to deploying a security guard at a company's entrance but allowing anyone who looks like a serviceman to enter the building. An intruder can pretend to be a serviceman, bypass the perimeter security, and compromise the serviced Internet application.

FIG. 1 depicts a typical prior art server access architecture. With in a corporation's local network 190, a variety of computer systems may reside. These systems typically include application servers 120 such as Web servers and e-mail servers, user workstations running local clients 130 such as e-mail readers and Web browsers, and data storage devices 110 such as databases and network connected disks. These systems communicate with each other via a local communication network such as Ethernet 150. Firewall system 140 resides between the local communication network and Internet 160. Connected to the Internet 160 are a host of external servers 170 and external clients 180.

Local clients 130 can access application servers 120 and shared data storage 110 via the local communication network. External clients 180 can access external application servers 170 via the Internet 160. In instances where a local server 120 or a local client 130 requires access to an external server 170 or where an external client 180 or an external server 170 requires access to a local server 120, electronic communications in the appropriate protocol for a given application server flow through "always open" ports of firewall system 140.

The security risks do not stop there. After taking over the mail server, it is relatively easy for the intruder to use it as a launch pad to compromise other business servers and steal critical business information. This information may include financial data, sales projections, customer pipelines, contract negotiations, legal matters, and operational documents. This kind of hacker attack on servers can cause immeasurable and irreparable losses to a business.

In the 1980's, viruses were spread mainly by floppy diskettes. In today's interconnected world, applications such as e-mail serve as a transport for easily and widely spreading viruses. Viruses such as "I Love You" use the technique exploited by distributed Denial of Service (DDoS) attackers to mass propagate. Once the "I Love You" virus is received, the recipient's Microsoft Outlook sends emails carrying viruses to everyone in the Outlook address book. The "I Love You" virus infected millions of computers within a short time of its release. Trojan horses, such as Code Red use this same technique to propagate themselves. Viruses and Trojan horses can cause significant lost productivity due to down time and the loss of crucial data.

The Nimda worm simultaneously attacked both email and web applications. It propagated itself by creating and sending infectious email messages, infecting computers over the network and striking vulnerable Microsoft IIS Web servers, deployed on Exchange mail servers to provide web mail.

Most e-mail and Web requests and responses are sent in plain text today, making it just as exposed as a postcard. This includes the e-mail message, its header, and its attachments, or in a Web context, a user name and password and/or cookie information in an HTTP request. In addition, when you dial into an Internet Service Provider (ISP) to send or receive e-mail messages, the user ID and password are also sent in plain text, which can be snooped, copied, or altered. This can be done without leaving a trace, making it impossible to know whether a message has been compromised.

The following are additional security risks caused by Internet applications:

E-mail spamming consumes corporate resources and impacts productivity. Furthermore, spammers use a corporation's own mail servers for unauthorized email relay, making it appear as if the message is coming from that corporation.

E-mail and Web abuse, such as sending and receiving inappropriate messages and Web pages, are creating liabilities for corporations. Corporations are increasingly facing litigation for sexual harassment or slander due to e-mail their employees have sent or received.

Regulatory requirements such as the Health Insurance Portability and Accountability Act (HIPAA) and the Gramm-Leach-Bliley Act (regulating financial institutions) create liabilities for companies where confidential patient or client information may be exposed in e-mail and/or Web servers or communications including e-mails, Web pages and HTTP requests.

Using the "always open" port, a hacker can easily reach an appropriate Internet application server, exploit its vulnerabilities, and take over the server. This provides hackers easy access to information available to the server, often including sensitive and confidential information. The systems and methods according to the present invention provide enhanced security for communications involved with such Internet applications requiring an "always-open" connection.

SUMMARY

The present invention is directed to systems and methods for enhancing security of electronic communications in Internet applications. One preferred embodiment according to the present invention includes a system data store (SDS), a system processor and one or more interfaces to one or more communications network over which electronic communications are transmitted and received. The SDS stores data needed to provide the desired system functionality and may include, for example, received communications, data associated with such communications, information related to known security risks, information related to corporate policy with respect to communications for one or more applications (e.g., corporate e-mail policy or Web access guidelines) and predetermined responses to the identification of particular security risks, situations or anomalies. The SDS may include multiple physical and/or logical data stores for storing the various types of information. Data storage and retrieval functionality may be provided by either the system processor or data storage processors associated with the data store. The system processor is in communication with the SDS via any suitable communication channel(s); the system processor is in communication with the one or more interfaces via the same, or differing, communication channel(s). The system processor may include one or more processing elements that provide electronic communication reception, transmission, interrogation, analysis and/or other functionality.

Accordingly, one preferred method of electronic communication security enhancement includes a variety of steps that may, in certain embodiments, be executed by the environment summarized above and more fully described below or be stored as computer executable instructions in and/or on any suitable combination of computer-readable media. In some embodiments, an electronic communication directed to or originating from an application server is received. The source of the electronic communication may be any appropriate internal or external client or any appropriate internal or external application server. One or more tests are applied to the received electronic communication to evaluate the received electronic communication for a particular security risk. A risk profile associated with the received electronic communication is stored based upon this testing. The stored risk profile is compared against data accumulated from previously received electronic communications to determine whether the received electronic communication is anomalous. If the received communication is determined to be anomalous, an anomaly indicator signal is output. The output anomaly indicator signal may, in some embodiments, notify an application server administrator of the detected anomaly by an appropriate notification mechanism (e.g., pager, e-mail, etc.) or trigger some corrective measure such as shutting down the application server totally, or partially (e.g., deny access to all communications from a particular source).

Some embodiments may also support a particular approach to testing the received electronic communication, which may also be applicable for use in network level security and intrusion detection. In such embodiments, each received communication is interrogated by a plurality of interrogation engines where each such interrogation engine is of a particular type designed to test the communication for a particular security risk. Each received communication is interrogated by a series of interrogation engines of differing types. The ordering and selection of interrogation engine types for use with received communications may, in some embodiments, be configurable, whereas in others the ordering and selection may be fixed.

Associated with each interrogation engine is a queue of indices for communications to be evaluated by the particular interrogation engine. When a communication is received, it is stored and assigned an index. The index for the receive communication is placed in a queue associated with an interrogation of a particular type as determined by the interrogation engine ordering. Upon completion of the assessment of the received communication by the interrogation engine associated with the assigned queue, the index is assigned to a new queue associated with an interrogation engine of the next type as determined by the interrogation engine ordering. The assignment process continues until the received communication has been assessed by an interrogation engine of each type as determined by the interrogation engine selection. If the communication successfully passes an interrogation engine of each type, the communication is forwarded to its appropriate destination. In some embodiments, if the communication fails any particular engine, a warning indicator signal may be output; in some such embodiments, the communication may then be forwarded with or without an indication of its failure to its appropriate destination, to an application administrator and/or both.

In some embodiments using this queuing approach, the assignment of an index for a received communication to a queue for an interrogation engine of a particular type may involve an evaluation of the current load across all queues for the particular interrogation engine type. If a threshold load exists, a new instance of an interrogation engine of the particular type may be spawned with an associated index queue. The index for the received communication may then be assigned to the queue associated with the interrogation engine instance. In some embodiments, the load across the queues associated with the particular type may be redistributed across the queues including the one associated with the new interrogation engine instance prior to the assignment of the index associated with the newly received communication to the queue. Some embodiments may also periodically, or at particular times such as a determination that a particular queue is empty, evaluate the load across queues for a type of interrogation engine and if an inactivity threshold is met, shutdown excess interrogation instances of that type and disassociating or deallocating indices queues associated with shutdown instances.

Alternatively, a fixed number of interrogation engines of each particular type may be configured in which case dynamic instance creation may or may not occur. In fixed instance embodiments not supporting dynamic instance creation, assignment to a particular queue may result from any appropriate allocation approach including load evaluation or serial cycling through queues associated with each interrogation engine instance of the particular type desired.

In some embodiments, anomaly detection may occur through a process outlined as follows. In such a process, data associated with a received communication is collected. The data may be accumulated from a variety of source such as from the communication itself and from the manner of its transmission and receipt. The data may be collected in any appropriate manner such as the multiple queue interrogation approach summarized above and discussed in greater detail below. Alternatively, the data collection may result from a parallel testing process where a variety of tests are individually applied to the received communication in parallel. In other embodiments, a single combined analysis such as via neural network may be applied to simultaneously collect data associated with the received communication across multiple dimensions.

The collected data is then analyzed to determine whether the received communication represents an anomaly. The analysis will typically be based upon the collected data associated with the received communication in conjunction with established communication patterns over a given time period represented by aggregated data associated with previously received communications. The analysis may further be based upon defined and/or configurable anomaly rules. In some embodiments, analysis may be combined with the data collection; for instance, a neural network could both collect the data associated with the received communication and analyze it.

Finally, if an anomaly is detected with respect to the received communication, an indicator signal is generated. The generated signal may provide a warning to an application administrator or trigger some other appropriate action. In some embodiments, the indicator signal generated may provide a generalized indication of an anomaly; in other embodiments, the indicator may provide additional data as to a specific anomaly, or anomalies, detected. In the latter embodiments, any warning and/or actions resulting from the signal may be dependent upon the additional data.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention.

DETAILED DESCRIPTION

Figure 1:
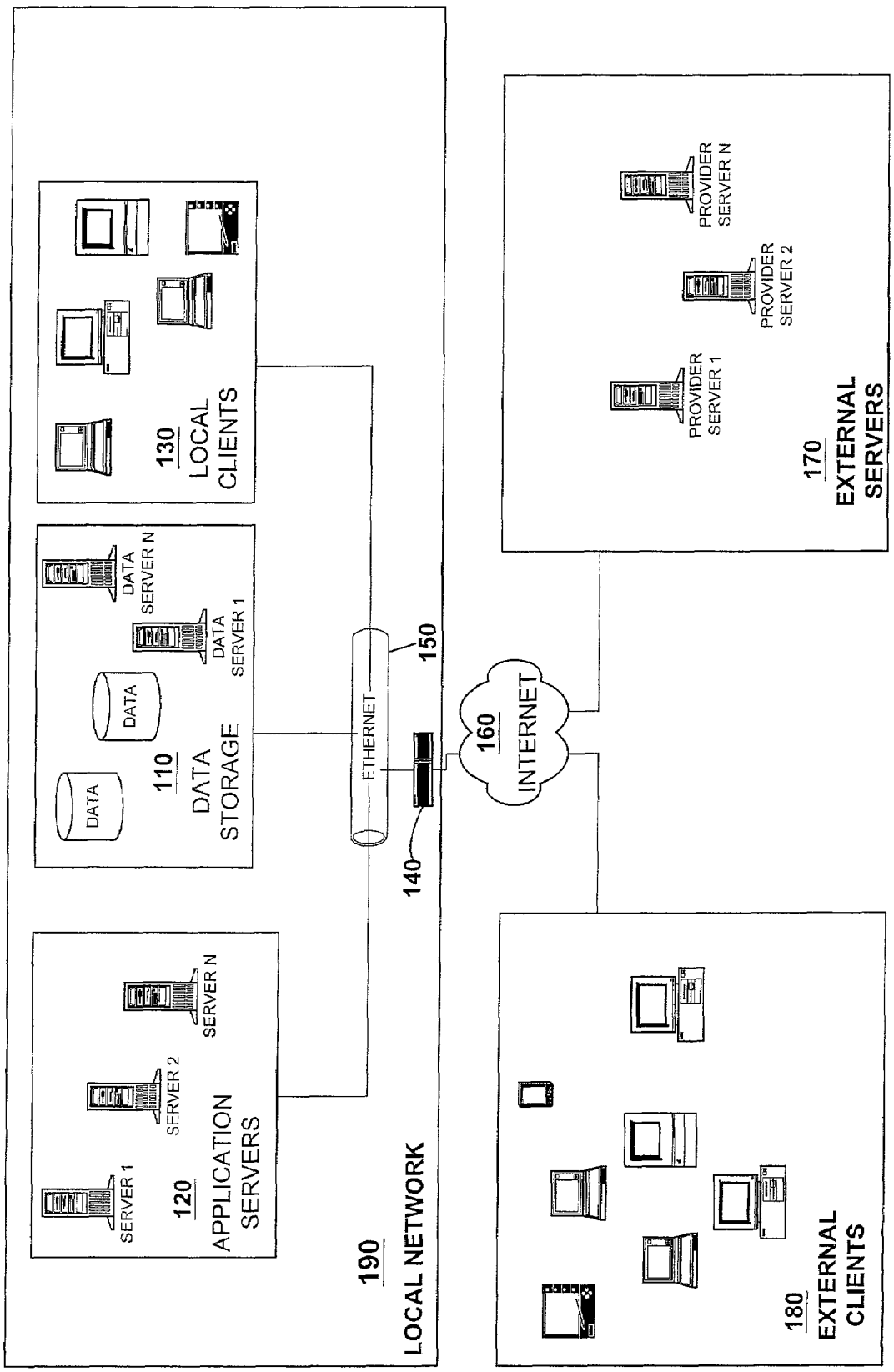
FIG. 1 depicts a typical prior art access environment.

Exemplary embodiments of the present invention are now described in detail. Referring to the drawings, like numbers indicate like parts throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context clearly dictates otherwise.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Architecture of a Typical Access Environment

Figure 2:
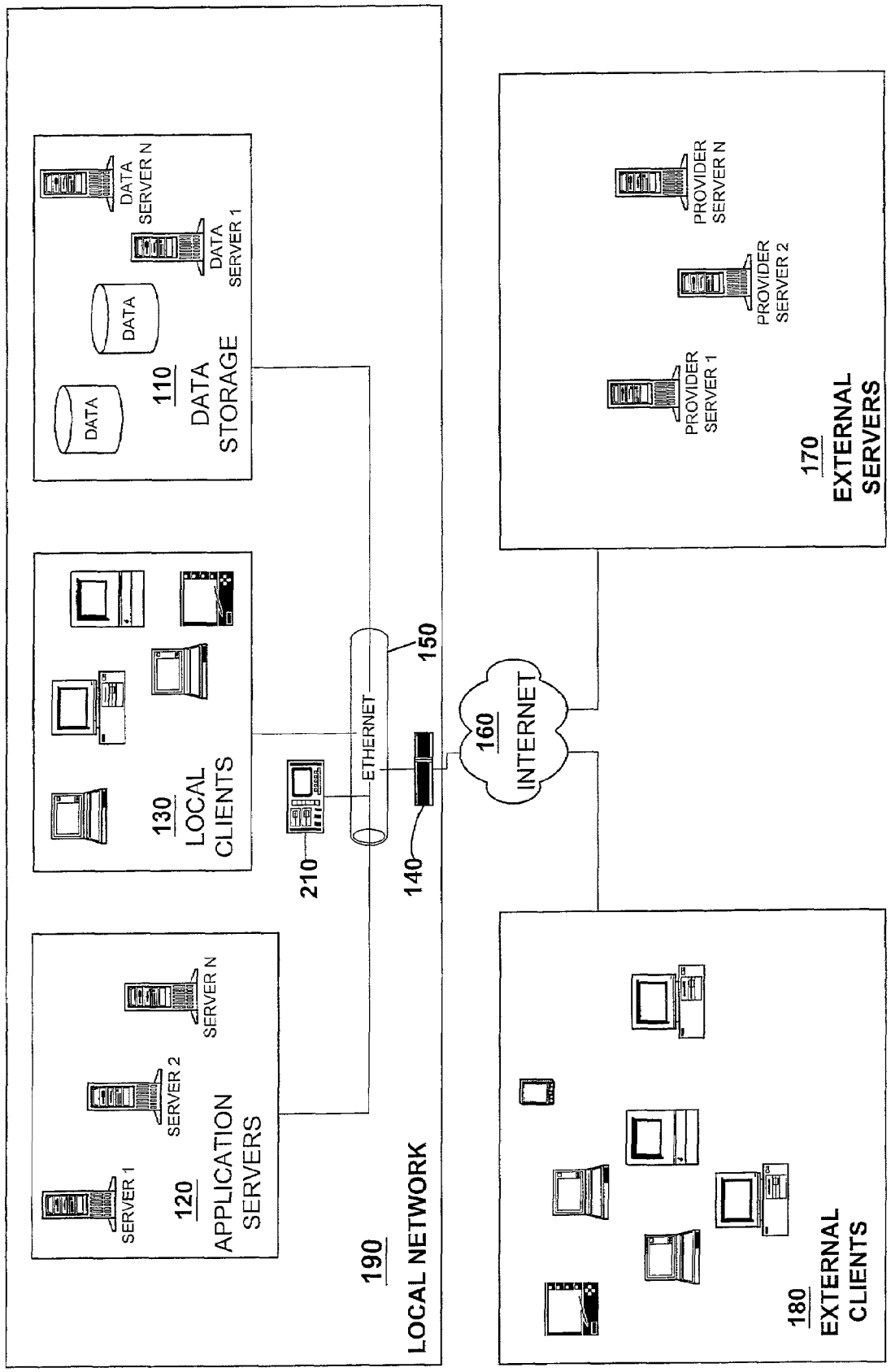
FIG. 2 depicts a hardware diagram for an environment using one preferred embodiment according to the present invention.

FIG. 2 depicts a typical environment according to the present invention. As compared with FIG. 1, the access environment using systems and methods according to the present invention may include a hardware device 210 connected to the local communication network such as Ethernet 180 and logically interposed between the firewall system 140 and the local servers 120 and clients 130. All application related electronic communications attempting to enter or leave the local communications network through the firewall system 140 are routed to the hardware device 210 for application level security assessment and/or anomaly detection. Hardware device 210 need not be physically separate from existing hardware elements managing the local communications network. For instance, the methods and systems according to the present invention could be incorporated into a standard firewall system 140 or router (not shown) with equal facility. In environment not utilizing a firewall system, the hardware device 210 may still provide application level security assessment and/or anomaly detection.

For convenience and exemplary purposes only, the foregoing discussion makes reference to hardware device 210; however, those skilled in the art will understand that the hardware and/or software used to implement the systems and methods according to the present invention may reside in other appropriate network management hardware and software elements. Moreover, hardware device 210 is depicted as a single element. In various embodiments, a multiplicity of actual hardware devices may be used. Multiple devices that provide security enhancement for application servers of a particular type such as e-mail or Web may be used where communications of the particular type are allocated among the multiple devices by an appropriate allocation strategy such as (1) serial assignment that assigns a communication to each device sequentially or (2) via the use of a hardware and/or software load balancer that assigns a communication to the device based upon current device burden. A single device may provide enhanced security across multiple application server types, or each device may only provide enhanced security for a single application server type.

In one embodiment, hardware device 210 may be a rack-mounted Intel-based server at either 1U or 2U sizes. The hardware device 210 can be configured with redundant components such as power supplies, processors and disk arrays for high availability and scalability. The hardware device 210 may include SSL/TLS accelerators for enhanced performance of encrypted messages.

The hardware device 210 will include a system processor potentially including multiple processing elements where each processing element may be supported via Intel-compatible processor platforms preferably using at least one PENTIUM III or CELERON (Intel Corp., Santa Clara, Calif.) class processor; alternative processors such as UltraSPARC (Sun Microsystems, Palo Alto, Calif.) could be used in other embodiments. In some embodiments, security enhancement functionality, as further described below, may be distributed across multiple processing elements. The term processing element may refer to (1) a process running on a particular piece, or across particular pieces, of hardware, (2) a particular piece of hardware, or either (1) or (2) as the context allows.

The hardware device 210 would have an SDS that could include a variety of primary and secondary storage elements. In one preferred embodiment, the SDS would include RAM as part of the primary storage; the amount of RAM might range from 128 MB to 4 GB although these amounts could vary and represent overlapping use such as where security enhancement according to the present invention is integrated into a firewall system. The primary storage may in some embodiments include other forms of memory such as cache memory, registers, non-volatile memory (e.g, FLASH, ROM, EPROM, etc.), etc.

The SDS may also include secondary storage including single, multiple and/or varied servers and storage elements. For example, the SDS may use internal storage devices connected to the system processor. In embodiments where a single processing element supports all of the security enhancement functionality, a local hard disk drive may serve as the secondary storage of the SDS, and a disk operating system executing on such a single processing element may act as a data server receiving and servicing data requests.

It will be understood by those skilled in the art that the different information used in the security enhancement processes and systems according to the present invention may be logically or physically segregated within a single device serving as secondary storage for the SDS; multiple related data stores accessible through a unified management system, which together serve as the SDS; or multiple independent data stores individually accessible through disparate management systems, which may in some embodiments be collectively viewed as the SDS. The various storage elements that comprise the physical architecture of the SDS may be centrally located, or distributed across a variety of diverse locations.

The architecture of the secondary storage of the system data store may vary significantly in different embodiments. In several embodiments, database(s) are used to store and manipulate the data; in some such embodiments, one or more relational database management systems, such as DB2 (IBM, White Plains, N.Y.), SQL Server (Microsoft, Redmond, Wash.), ACCESS (Microsoft, Redmond, Wash.), ORACLE 8i (Oracle Corp., Redwood Shores, Calif.), Ingres (Computer Associates, Islandia, N.Y.), MySQL (MySQL AB, Sweden) or Adaptive Server Enterprise (Sybase Inc., Emeryville, Calif.), may be used in connection with a variety of storage devices/file servers that may include one or more standard magnetic and/or optical disk drives using any appropriate interface including, without limitation, IDE and SCSI. In some embodiments, a tape library such as Exabyte X80 (Exabyte Corporation, Boulder, Colo.), a storage attached network (SAN) solution such as available from (EMC, Inc., Hopkinton, Mass.), a network attached storage (NAS) solution such as a NetApp Filer 740 (Network Appliances, Sunnyvale, Calif.), or combinations thereof may be used. In other embodiments, the data store may use database systems with other architectures such as object-oriented, spatial, object-relational or hierarchical or may use other storage implementations such as hash tables or flat files or combinations of such architectures. Such alternative approaches may use data servers other than database management systems such as a hash table look-up server, procedure and/or process and/or a flat file retrieval server, procedure and/or process. Further, the SDS may use a combination of any of such approaches in organizing its secondary storage architecture.

The hardware device 210 would have an appropriate operating system such as WINDOWS/NT, WINDOWS 2000 or WINDOWS/XP Server (Microsoft, Redmond, Wash.), Solaris (Sun Microsystems, Palo Alto, Calif.), or LINUX (or other UNIX variant).

In one preferred embodiment, the hardware device 210 includes a pre-loaded, pre-configured, and hardened UNIX operating system based upon FreeBSD (FreeBSD, Inc., http://www.freebsd.org). In this embodiment, the UNIX kernel has been vastly reduced, eliminating non-essential user accounts, unneeded network services, and any functionality that is not required for security enhancement processing. The operating system code has been significantly modified to eliminate security vulnerabilities.

Depending upon the hardware/operating system platform, appropriate server software may be included to support the desired access for the purpose of configuration, monitoring and/or reporting. Web server functionality may be provided via an Internet Information Server (Microsoft, Redmond, Wash.), an Apache HTTP Server (Apache Software Foundation, Forest Hill, Md.), an iPlanet Web Server (iPlanet E-Commerce Solutions—A Sun—Netscape Alliance, Mountain View, Calif.) or other suitable Web server platform. The e-mail services may be supported via an Exchange Server (Microsoft, Redmond, Wash.), sendmail or other suitable e-mail server. Some embodiments may include one or more automated voice response (AVR) systems that are in addition to, or instead of, the aforementioned access servers. Such an AVR system could support a purely voice/telephone driven interface to the environment with hard copy output delivered electronically to suitable hard copy output device (e.g., printer, facsimile, etc.), and forward as necessary through regular mail, courier, inter-office mail, facsimile or other suitable forwarding approach. In one preferred embodiment, an Apache server variant provides an interface for remotely configuring the hardware device 210. Configuration, monitoring, and/or reporting can be provided using some form of remote access device or software. In one preferred embodiment, SNMP is used to configure and/or monitor the device. In one preferred embodiment, any suitable remote client device is used to send and retrieve information and commands to/from the hardware device 210. Such a remote client device can be provided in the form of a Java client or a Windows-based client running on any suitable platform such as a conventional workstation or a handheld wireless device or a proprietary client running on an appropriate platform also including a conventional workstation or handheld wireless device.

Application Layer Electronic Communication Security Enhancement

Figure 3:
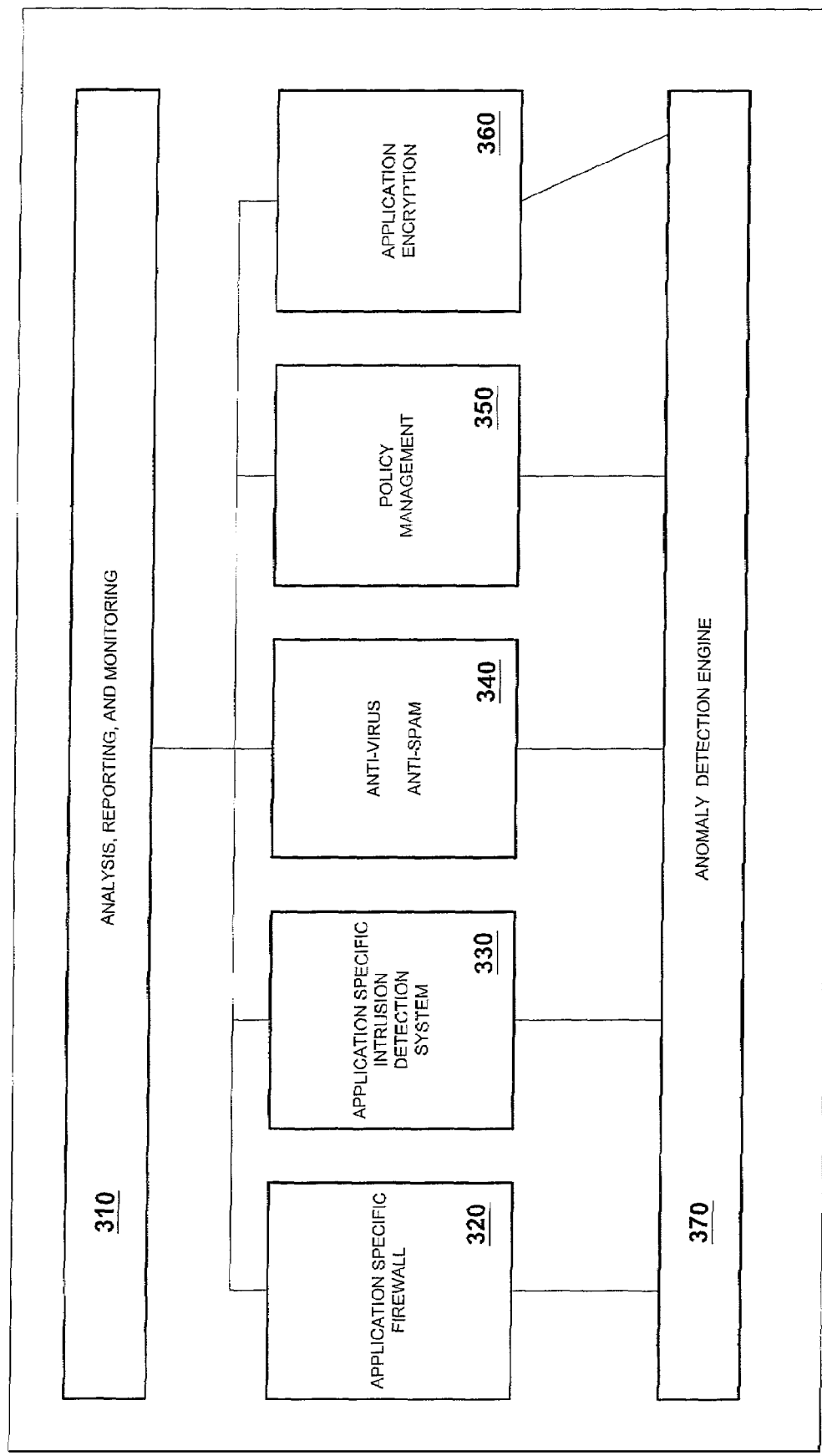
FIG. 3 is a logical block diagram of the components in a typical embodiment of the present invention.

FIG. 3 depicts a block diagram of the logical components of a security enhancement system according to the present invention. The overall analysis, reporting and monitoring functionality is represented by block 310, and anomaly detection is represented by block 370.

Blocks 320-360 represent different assessments that may be applied to electronic communications. These blocks are representative of assessments that may be performed and do not constitute an exhaustive representation of all possible assessments for all possible application server types. The terms "test" and "testing" may be used interchangeably with the terms "assess", "assessment" or "assessing" as appropriate in the description herein and in the claims that follow.

Application specific firewall 320 provides functionality to protect against application-specific attacks. For instance in the context of e-mail, this assessment could protect against attacks directed towards Extended SMTP, buffer overflow, and denial of service.

Application specific IDS 330 provides real-time monitoring of activities specific to the application server. This may also retrieve information from multiple layers including the application layer, network layer and operating system layer. This compliments a network intrusion detection system by adding an additional layer of application specific IDS monitoring.

Application specific anti-virus protection and anti-spam protection 340 provides support for screening application specific communications for associated viruses and/or spam.

Policy management 350 allows definition of corporate policies with respect to the particular application in regard to how and what application specific communications are sent, copied or blocked. Executable attachments or communication components, often sources of viruses and/or worms, and/or questionable content can be stripped or quarantined before they get to the application server or client. Mail messages from competitors can be blocked or copied. Large messages can be relegated to off-peak hours to avoid network congestion.

Application encryption 360 provides sending and receiving application communications securely, potentially leveraging hardware acceleration for performance.

The application security system processes incoming communications and appears to network intruders as the actual application servers. This prevents the actual enterprise application server from a direct or indirect attack.

An incoming or outgoing communication, and attachments thereto, are received by a security system according to the present invention. The communication in one preferred embodiment is an e-mail message. In other embodiments, the communication may be an HTTP request or response, a GOPHER request or response, an FTP command or response, telnet or WAIS interactions, or other suitable Internet application communication.

A data collection process occurs that applies one or more assessment strategies to the received communication. The multiple queue interrogation approach summarized above and described in detail below provides the data collection functionality in one preferred embodiment. Alternatively, the assessments may be performed on each received message in parallel. A separate processing element of the system processor would be responsible for applying each assessment to the received message. In other embodiments, multiple risk assessments may be performed on the received communication simultaneously using an approach such as a neural network. The application of each assessment, or the assessments in the aggregate, generates one or more risk profiles associated with the received communication. The risk profile or log file generated based upon the assessment of the received communication is stored in the SDS. The collected data may be used to perform threat analysis or forensics. This processing may take place after the communication is already received and forwarded.

In one preferred embodiment, particular assessments may be configurably enabled or disabled by an application administrator. An appropriate configuration interface system may be provided as discussed above in order to facilitate configuration by the application administrator.

An anomaly detection process analyzes the stored risk profile associated with the received communication in order to determine whether it is anomalous in light of data associated with previously received communications. In one preferred embodiment, the anomy detection process summarized above and described in detail below supports this detection functionality. Anomaly detection in some embodiments may be performed simultaneously with assessment. For instance, an embodiment using a neural network to perform simultaneous assessment of a received communication for multiple risks may further analyze the received communication for anomalies; in such an embodiment, the data associated with the previously received communications may be encoded as weighting factors in the neural network.

In some embodiments, the thresholds for various types of anomalies may be dynamically determined based upon the data associated with previously received communications. Alternatively, an interface may be provided to an application administrator to allow configuration of particular thresholds with respect to individual anomaly types. In some embodiments, thresholds by default may be dynamically derived unless specifically configured by an application administrator.

Anomalies are typically detected based upon a specific time period. Such a time period could be a particular fixed period (e.g., prior month, prior day, prior year, since security device's last reboot, etc.) and apply to all anomaly types. Alternatively, the time period for all anomaly types, or each anomaly type individually, may be configurable by an application administrator through an appropriate interface. Some embodiments may support a fixed period default for all anomaly types, or each anomaly type individually, which may be overridden by application administrator configuration.

In one preferred embodiment, the stored risk profile associated with the received communication is aggregated with data associated with previously received communications of the same type. This newly aggregate data set is then used in analysis of subsequently received communications of that type.

If an anomaly is detected, an anomaly indicator signal is output. The outputted signal may include data identifying the anomaly detected and the communication in which the anomaly was detected. Various types of anomalies are discussed below with respect to e-mail application security. These types of anomalies may be detected using the specific detection approach discussed below or any of the aforementioned alternative anomaly detection approaches.

The outputted signal may trigger a further response in some embodiments; alternatively, the outputted signal may be the response. In one preferred embodiment, the outputted signal may be a notification to one or more designated recipient via one or more respective, specified delivery platform. For instance, the notification could be in the form of an e-mail message, a page, a facsimile, an SNMP (Simple Network Management Protocol) alert, an SMS (Short Message System) message, a WAP (Wireless Application Protocol) alert, OPSEC (Operations Security) warning a voice phone call or other suitable message. Alternatively, such a notification could be triggered by the outputted signal.

Using SMNP allows interfacing with network level security using a manager and agent; an example would be monitoring traffic flow through a particular router. OPSEC is a formalized process and method for protecting critical information. WAP is an open, global specification that empowers mobile users with wireless devices to easily access and interact with information and services instantly. An example would be formatting a WAP page to a wireless device that supports WAP when an anomaly is detected. WAP pages are stripped down versions of HTML and are optimized for wireless networks and devices with small displays. SMS is a wireless technology that utilizes SMTP and SMNP for transports to deliver short text messages to wireless devices such as a Nokia 8260 phone. SMS messages could be sent out to these devices to alert a user of an intrusion detection of anomaly alert.

Instead of or in addition to a notification, one or more corrective measures could be triggered by the outputted signal. Such corrective measures could include refusing acceptance of further communications from the source of the received communication, quarantining the communication, stripping the communication so that it can be safely handled by the application server, and/or throttling excessive numbers of incoming connections per second to levels manageable by internal application servers.

In one preferred embodiment, an interface may be provided that allows an application administrator to selectively configure a desired response and associated this configured response with a particular anomaly type such that when an anomaly of that type is detected the configured response occurs.

Finally, if an anomaly is detected with respect to a received communication, the communication may or may not be forwarded to the intended destination. Whether communications determined to be anomalous are forwarded or not may, in certain embodiments, be configurable with respect to all anomaly types. Alternatively, forwarding of anomalous communications could be configurable with respect to individual anomaly types. In some such embodiments, a default forwarding setting could be available with respect to any individual anomaly types not specifically configured.

Multiple Queue Approach to Interrogation of Electronic Communications

Figure 7:
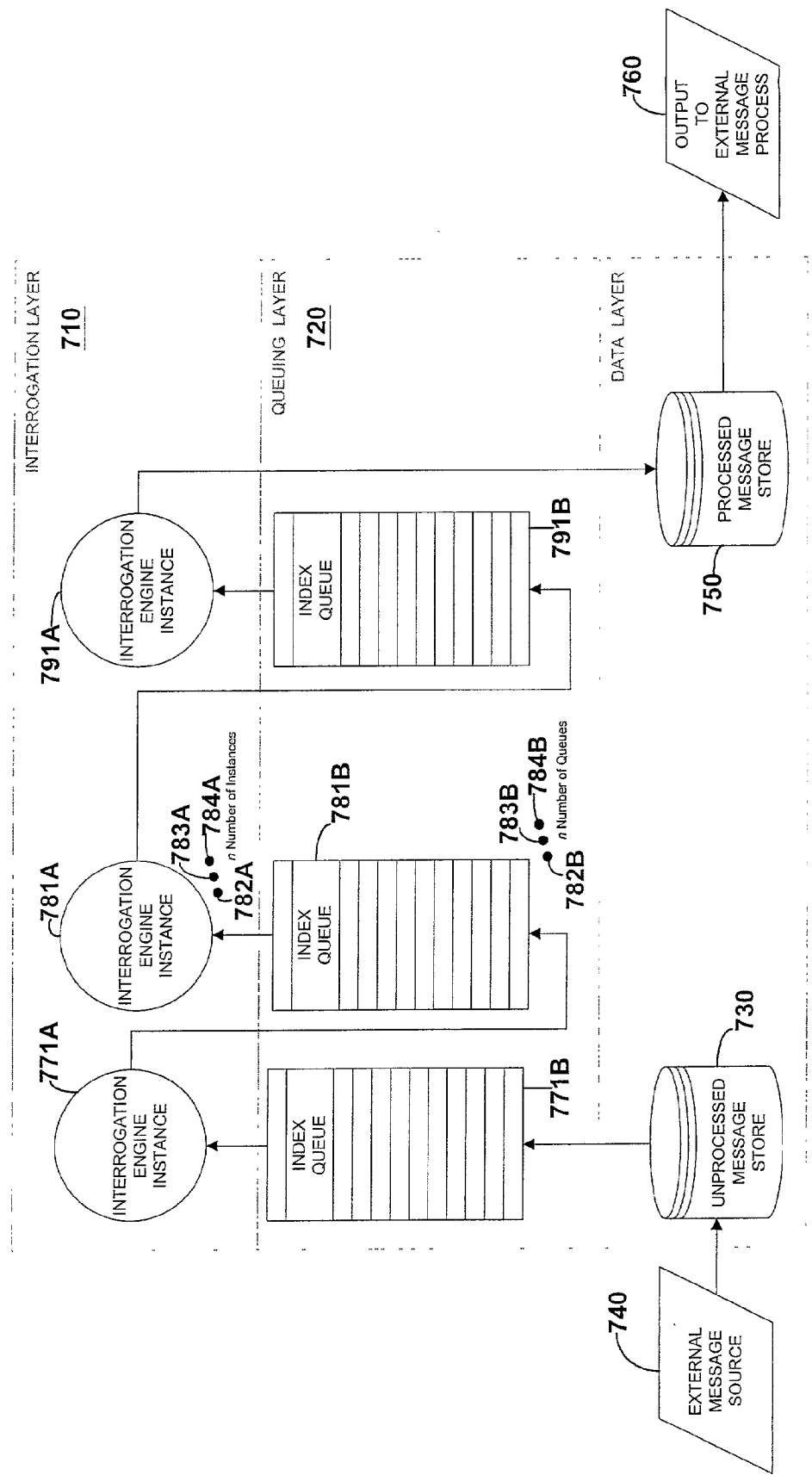
FIG. 7 is a block diagram depicting the architecture of an exemplary embodiment of a risk assessment approach according to the present invention using multiple queues to manage the application of a plurality of risk assessments to a received communication.

With reference to FIG. 7, a multiple queue approach is provided for applying a plurality of risk assessments to a received communication.

Messages are first placed in an unprocessed message store 730, a portion of the SDS, for advanced processing and administration. Messages come in from an external source 740 and are placed in this store 730. This store 730 maintains physical control over the message until the end of the process or if a message does not pass interrogation criteria and is, therefore, quarantined.

An index to the message in the store 730 is used to pass through each of the queues 771B, 781B-784B, 791B in the queuing layer 720 and to the interrogation engines 771A, 781A-784A, 791A instead of the actual message itself to provide scalability and performance enhancements as the index is significantly smaller than the message itself.

Both the queues and the interrogation engines use the index to point back to the actual message in the unprocessed message store 730 to perform actions on the message. Any suitable index allocation approach may be used to assign an index to a received message, or communication. For instances, indices may be assigned by incrementing the index assigned to the previously received communication beginning with some fixed index such as 0 for the first received communication; the index could be reset to the fixed starting point after a sufficiently large index has been assigned. In some embodiments, an index may be assigned based upon characteristics of the received communication such as type of communication, time of arrival, etc.

This approach provides independent processing of messages by utilizing a multi-threaded, multi-process methodology, thereby providing a scalable mechanism to process high volumes of messages by utilizing a multi-threaded, multi-process approach.

By processing messages independently, the queuing layer 720 decides the most efficient means of processing by either placing an index to the message on an existing queue or creating a new queue and placing the index to the message on that queue. In the event that a new queue is created, a new instance of the particular interrogation engine type will be created that will be acting on the new queue.

Queues can be added or dropped dynamically for scalability and administration. The application administrator can, in one preferred embodiment, configure the original number of queues to be used by the system at start-up. The administrator also has the capability of dynamically dropping or adding specific queues or types of queues for performance and administration purposes. Each queue is tied to a particular interrogation engine where multiple queues and multiple processes can exist.

Proprietary application-specific engines can act on each queue for performing content filtering, rules-based policy enforcement, and misuse prevention, etc. A loosely coupled system allows for proprietary application-specific applications to be added enhancing functionality.

This design provides the adaptive method for message interrogation. Application-specific engines act on the message via the index to the message in the unprocessed message store for completing content interrogation.

Administration of the queues provides for retrieving message details via an appropriate interface such as a Web, e-mail and/or telephone based interface system as discussed above in order to facilitate access and management by the application administrator. Administration of the queues allows the administrator to select message queue order (other than the system default) to customize the behavior of the system to best meet the needs of the administrator's particular network and system configuration.

Figure 8A:
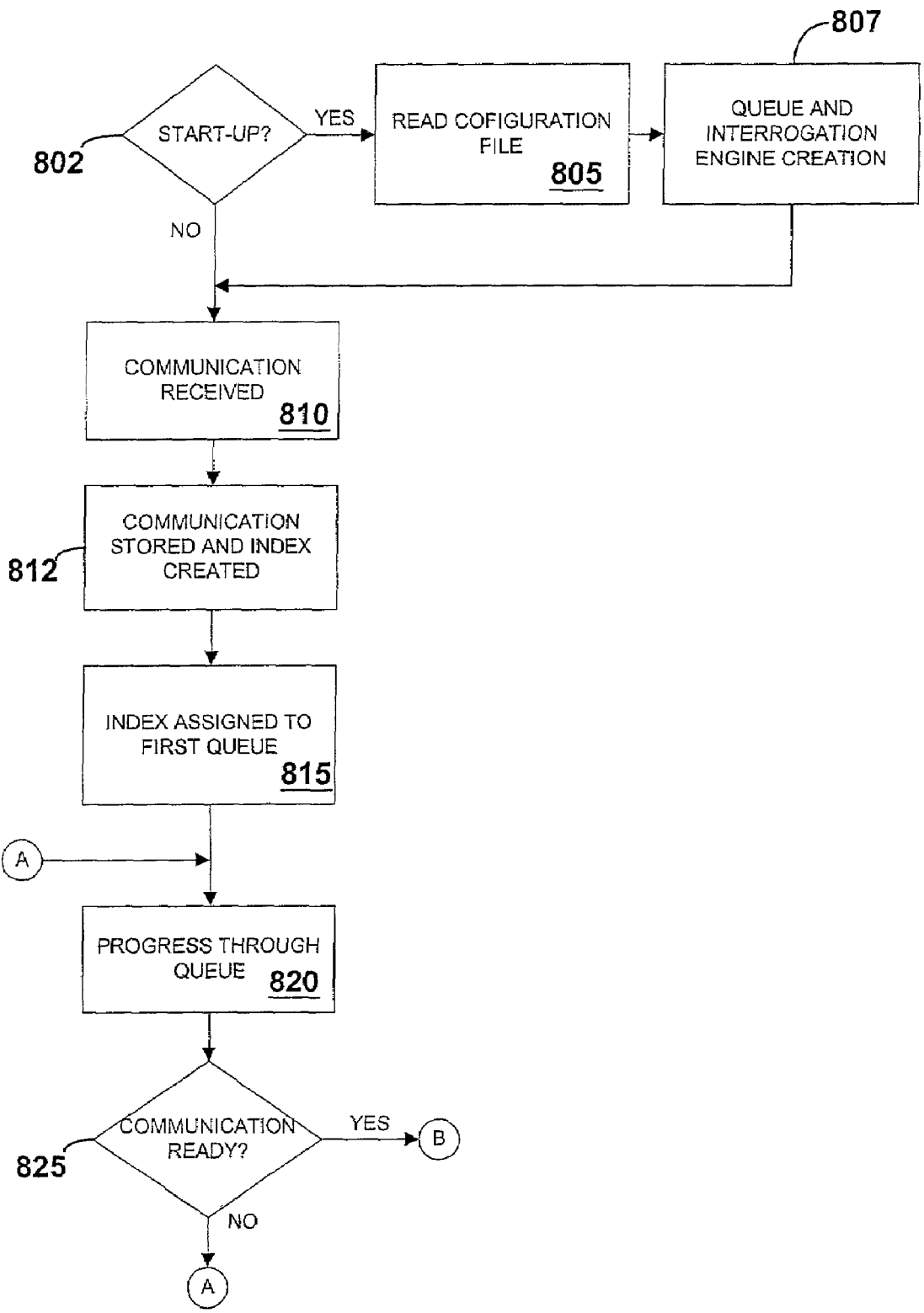
FIGS. 8A-8B are a flow chart depicting the process of accessing risk associated with a received communication using the architecture depicted in FIG. 7.
Figure 8B:
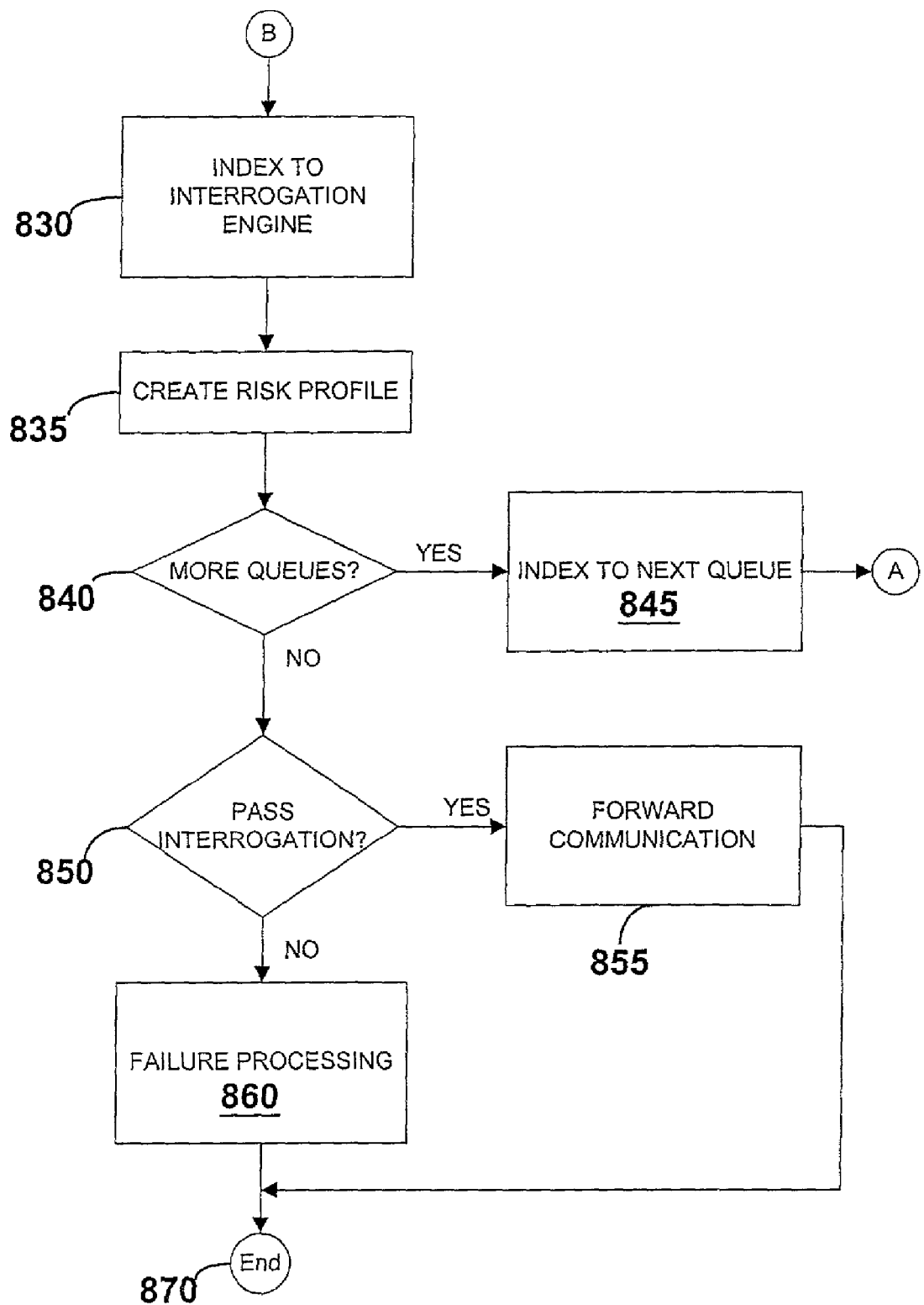

FIGS. 8A-8B are flow charts depicting use of the multiple queue approach to assess risk associated with a received communication. At step 802 a determination is made if the start-up of the process is being initiated; if so, steps 805 and 807 are performed to read appropriate configuration files from the SDS to determine the type, number and ordering of interrogation engines and the appropriate queues and instances are created. If not, the process waits at step 810 for receipt of a communication.

Upon receipt at step 812, the communication is stored in a portion of the SDS referred to as the unprocessed message store. The communication is assigned at step 815 an index used to uniquely identify it in the unprocessed message store, and this index is placed in the first queue based upon the ordering constraints.

The processing that occurs at step 810 awaiting receipt of communication continues independently of the further steps in this process, and will consequently spawn a new traversal of the remainder of the flow chart with each received communication. In some embodiments, multiple instances of step 810 may be simultaneously awaiting receipt of communications.

In some embodiments, the receipt of a communication may trigger a load evaluation to determine if additional interrogation engines and associated queues should be initiated. In other embodiments, a separate process may perform this load analysis on a periodic basis and/or at the direction of an application administrator.

The index moves through the queue 820 until it is ready to be interrogated by the interrogation engine associated with the queue as determined in step 825. This incremental movement is depicted as looping between steps 820 and 825 until ready for interrogation. If the communication is not ready for evaluation at step 825, the communication continues moves to move through the queue at step 820. If the communication is ready, the index is provided to the appropriate interrogation engine at step 830 in FIG. 8B.

The interrogation engine processes the communication based upon its index in step 830. Upon completion of interrogation in step 835, the interrogation creates a new risk profile associated with the received communication based upon the interrogation.

If additional interrogations are to occur (step 840), the index for the communication is place in a queue for an instance of the next interrogation type in step 845. Processing continues with step 820 as the index moves through this next queue.

If no more interrogations are required (step 840), a further check is made to determine if the communication passed interrogation by all appropriate engines at step 850. If the communication passed all interrogations, then it is forwarded to its destination in step 855 and processing with respect to this communication ends at step 870.

If the communication failed one or more interrogation as determined at step 850, failure processing occurs at step 860. Upon completion of appropriate failure processing, processing with respect to this communication ends at step 870.

Failure processing may involve a variety of notification and/or corrective measures. Such notifications and/or corrective measures may include those as discussed above and in further detail below with respect to anomaly detection.

Anomaly Detection Process

Figure 6:
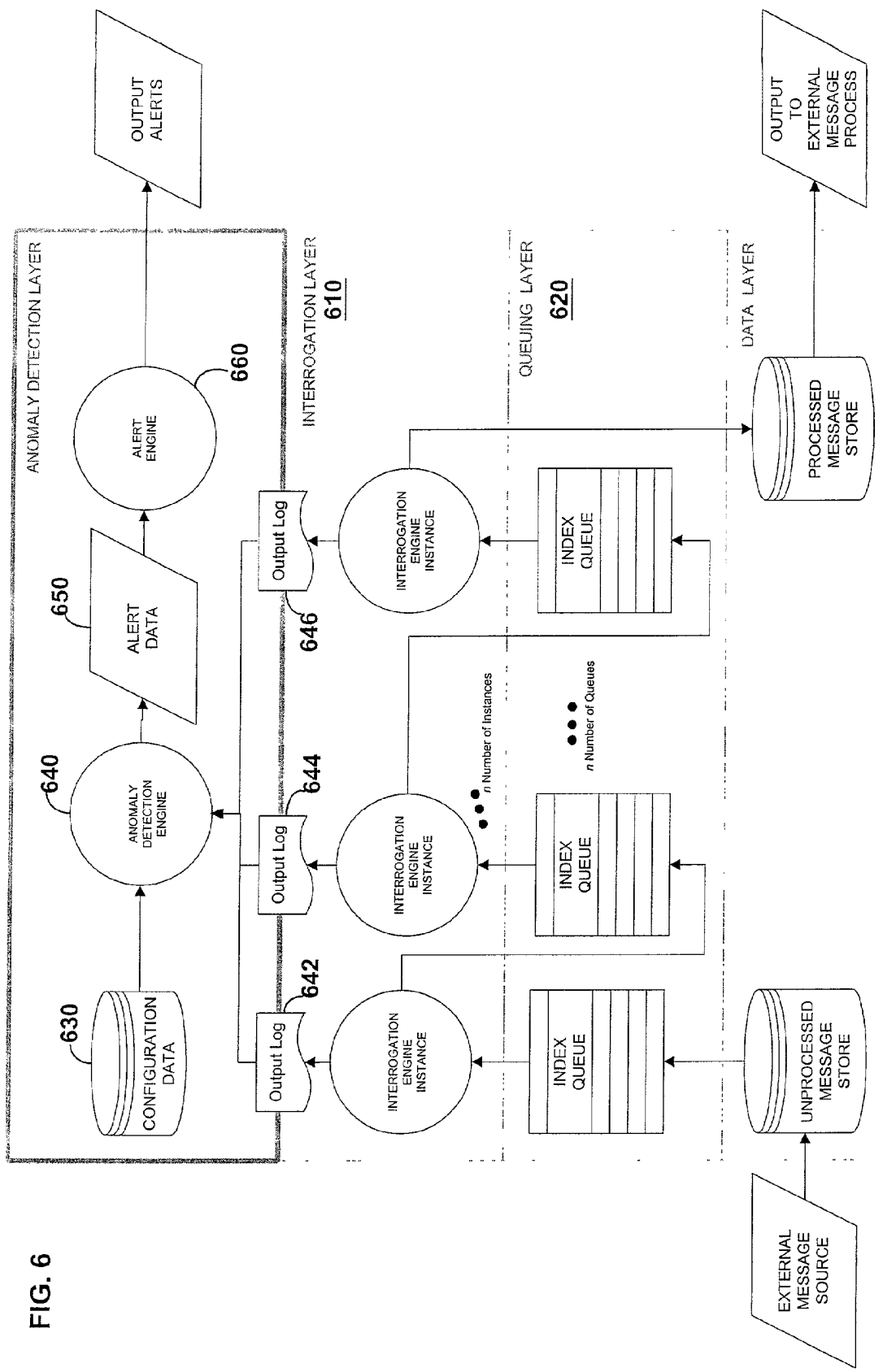
FIG. 6 is a bock diagram depicting the architecture of an exemplary embodiment of a security enhancement system according to the present invention.

The Anomaly Detection process according to an exemplary embodiment of the present invention uses three components as depicted in FIG. 6:

1. Collection Engine

This is where the actual collection of data occurs. The collection engine receives a communication directed to or originating from an application server. One or more tests are applied to the received communication. These one or more tests may correspond to the various risk assessments discussed above.

The collection engine in one preferred embodiment as depicted in FIG. 6 uses the multiple queue approach discussed above; however, this particular collection engine architecture is intended as exemplary rather than restrictive with respect to collection engines usable within the context of this anomaly detection process.

As depicted in FIG. 6, the collection engine includes one or more interrogation engines of one or more interrogation engine types in an interrogation layer 610. Associated with each interrogation engine type in a queuing layer 620 is at least one indices queue containing the indices of received communication awaiting interrogation by an interrogation engine of the associated type. Collectively, the queuing layer 620 and the interrogation layer 610 form the collection engine. A received communication is received, stored in the SDS and assigned an index. The index is queued in the queuing layer for processing through the collection engine.

2. Analysis Engine

The data collected by the previous component is analyzed for unusual activity by the anomaly detection engine 640. The analysis is based on data accumulated from analysis of previously received communications over a period of time. A set of predefined heuristics may be used to detect anomalies using dynamically derived or predetermined thresholds. A variety of anomaly types may be defined generally for all types of Internet application communications while others may be defined for only particular application types such as e-mail or Web. The data associated with previously received communications and appropriate configuration data 630 are stored in the SDS.

The set of anomaly types that the analysis engine will detect may be selected from a larger set of known anomaly types. The set of interest may be set at compile time or configurable at run time, or during execution in certain embodiments. In embodiments using the set approach all anomaly types and configuration information are set within the analysis engine. In some such embodiments, different sets of anomalies may be of interest depending upon the type of communication received. In configurable at run time embodiments, anomaly types are read from a configuration file or interactively configured at run time of the analysis engine. As with the set approach, certain anomaly types may be of interest with respect to only selected types of communication. Finally, in some embodiments (including some set or configurable ones), an interface such as described above may be provided allowing reconfiguration of the anomaly types of interest and parameters associated therewith while the analysis engine is executing.

The thresholds for various types of anomalies may be dynamically determined based upon the data associated with previously received communications. Alternatively, an interface may be provided to an application administrator to allow configuration of particular thresholds with respect to individual anomaly types. In some embodiments, thresholds by default may be dynamically derived unless specifically configured by an application administrator.

Anomalies are typically detected based upon a specific time period. Such a time period could be a particular fixed period (e.g., prior month, prior day, prior year, since security device's last reboot, etc.) and apply to all anomaly types. Alternatively, the time period for all anomaly types, or each anomaly type individually, may be configurable by an application administrator through an appropriate interface such as those discussed above. Some embodiments may support a fixed period default for all anomaly types, or each anomaly type individually, which may be overridden by application administrator configuration.

In one preferred embodiment, as depicted in FIG. 6, information from the risk profiles 642, 644, 646 generated by the collection engine is compared with the acquired thresholds for anomaly types of interest. Based upon these comparisons, a determination is made as to whether the received communication is anomalous, and if so, in what way (anomaly type) the communication is anomalous.

In one preferred embodiment, the stored risk profile associated with the received communication is aggregated with data associated with previously received communications of the same type. This newly aggregate data set is then used in analysis of subsequently received communications of that type.

If an anomaly is detected, an anomaly indicator signal is output. The outputted signal may include data identifying the anomaly type detected and the communication in which the anomaly was detected such as alert data 650. Various types of anomalies are discussed below with respect to e-mail application security. These types of anomalies may be detected using the specific detection approach discussed below or any of the aforementioned alternative anomaly detection approaches.

3. Action Engine

Based on the analysis, this component takes a decision of what sort of action needs to be triggered. Generally the action involves alerting the administrator of the ongoing unusual activity. An alert engine 660 performs this task by providing any appropriate notifications and/or initiating any appropriate corrective actions.

The outputted signal may trigger a further response in some embodiments; alternatively, the outputted signal may be the response. In one preferred embodiment, the outputted signal may be a notification to one or more designated recipient via one or more respective, specified delivery platform. For instance, the notification could be in the form of an e-mail message, a page, a facsimile, an SNMP alert, an SMS message, a WAP alert, OPSEC warning a voice phone call or other suitable message. Alternatively, such a notification could be triggered by the outputted signal.

Instead of or in addition to a notification, one or more corrective measures could be triggered by the outputted signal. Such corrective measures could include refusing acceptance of further communications from the source of the received communication, quarantining the communication, stripping the communication so that it can be safely handled by the application server, and/or throttling excessive numbers of incoming connections per second to levels manageable by internal application servers.

In one preferred embodiment, an interface may be provided that allows an application administrator to selectively configure a desired response and associate this configured response with a particular anomaly type such that when an anomaly of that type is detected the configured response occurs.

Figure 4:
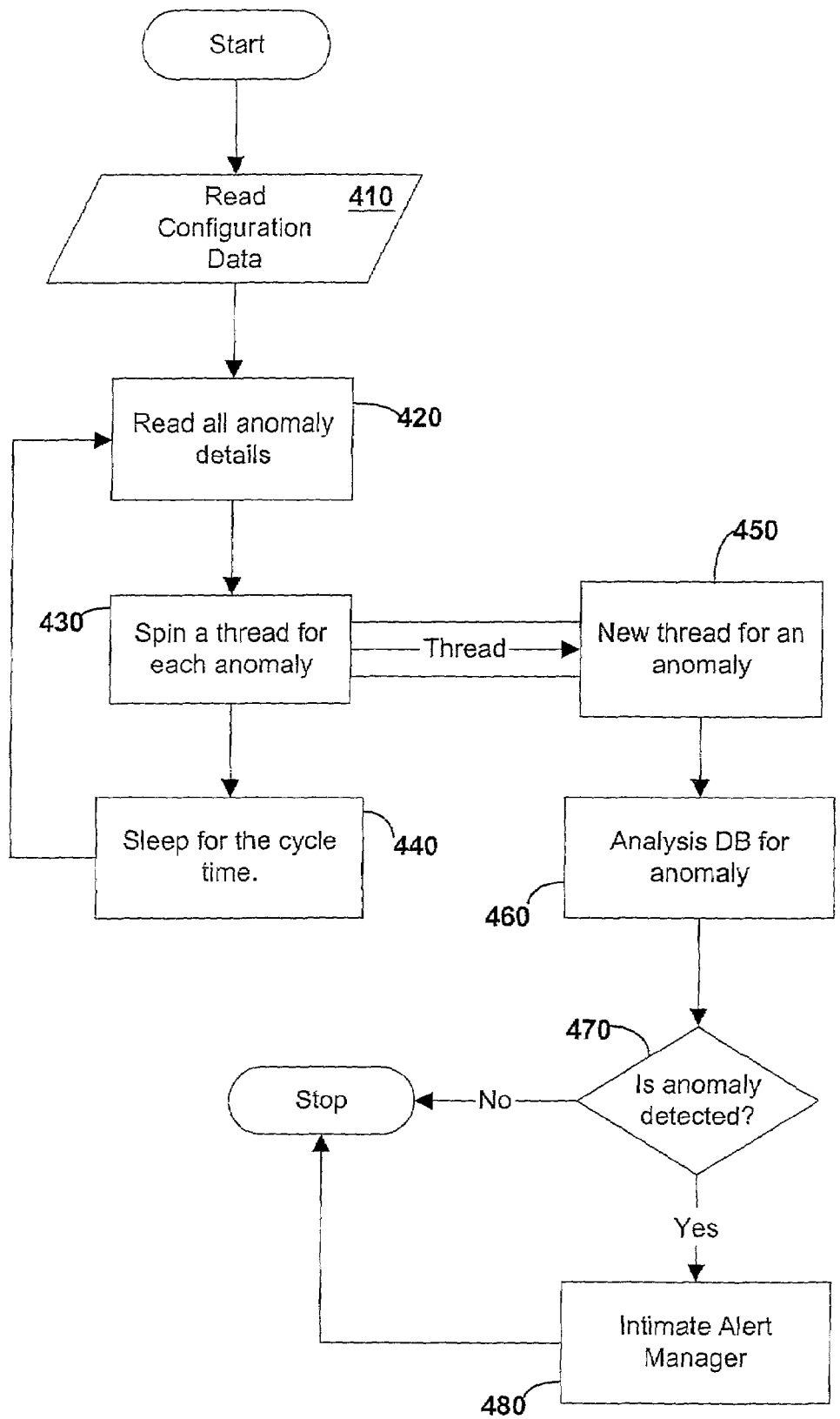
FIG. 4 is a flow chart of an exemplary anomaly detection process according to the present invention.

FIG. 4 depicts a flow chart in a typical anomaly detection process according to one preferred embodiment of the present invention. The process starts in step 410 by initializing various constraints of the process including the types of anomalies, thresholds for these types and time periods for which prior data is to be considered. This information may be configured interactively at initiation. In addition to, or instead of, the interactive configuration, previously stored configuration information may be loaded from the SDS.

The process continues at step 420 where anomaly definitional information is read (e.g., Incoming messages that have the same attachment within a 15 minute interval.). A determination is then made as to whether a new thread is needed; this determination is based upon the read the anomaly details (step not shown). In step 430, if a new thread is required, the thread is spun for processing in step 450. In step 440, the process sleeps for a specified period of time before returning to step 420 to read information regarding an anomaly.

Once processing of the new thread commences in step 450, information needed to evaluate the anomaly is retrieved from appropriate locations in the SDS, manipulated if needed, and analyzed in step 460. A determination in step 470 occurs to detect an anomaly. In one preferred embodiment, this step uses predetermined threshold values to make the determination; such predetermined threshold values could be provided interactively or via a configuration file. If an anomaly is not detected, the process stops.

If an anomaly is detected, an anomaly indicator signal is output at step 480 which may result in a notification. The possible results of anomaly detection are discussed in more detail above with respect to the Action Engine.

The types of anomalies may vary depending upon the type and nature of the particular application server. The following discussion provides exemplary definitions of anomalies where e-mail is the application context in question. Anomalies similar, or identical, to these can be defined with respect to other application server types.

Figure 5:
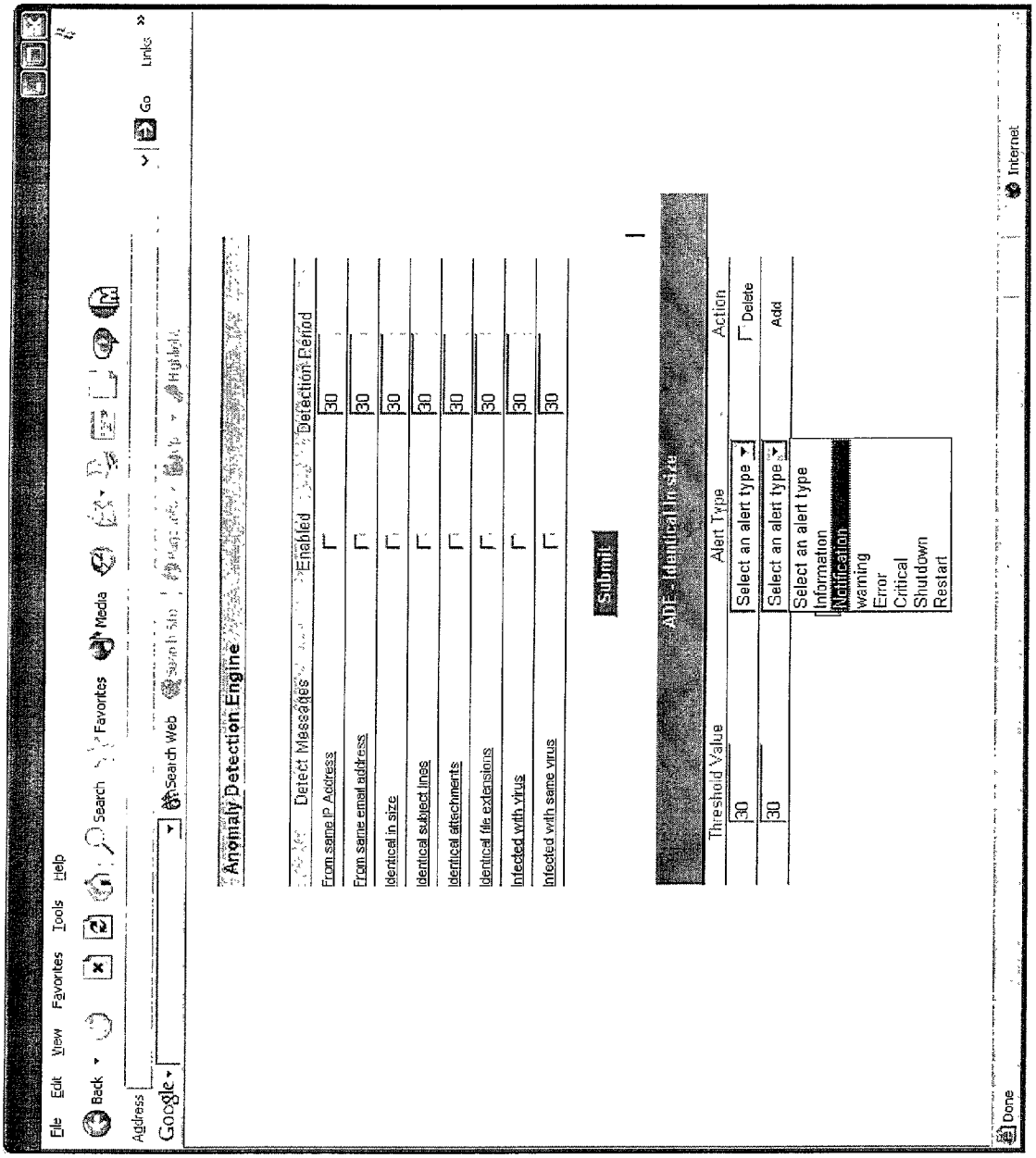
FIG. 5 is a sample anomaly detection configuration interface screen.

There are many potential anomaly types of interest in an e-mail system. The analysis is based on the collected data and dynamic rules for normality based on the historic audited data. In some embodiments, an application administrator can be provided with an interface for configuring predefined rules with respect to different anomaly types. FIG. 5 provides a sample screen for such an interface. The interface functionality may be provided via a Web server running on the security enhancement device or other suitable interface platform as discussed above.

In one preferred embodiment, the threshold value for the analysis for each anomaly is derived from an anomaly action table. The action for each anomaly is also taken from this table. The analysis identifies that some thing unusual has occurred and hands over to the action module. Enumerated below with respect to e-mail are anomalies of various types.

1. Messages from same IP Address—The point of collection for this anomaly is SMTPI/SMTPIS service. SMTPI/SMTPIS has information about the IP address from which the messages originate. The IP address is stored in the SDS. The criterion for this anomaly is that the number of message for the given period from the same IP address should be greater than the threshold. Based on the level of threshold, suitable alert is generated.
2. Messages from same Address (MAIL FROM)—The point of collection for this anomaly is SMTPI/SMTPIS service. SMTPI/SMTPIS has information about the address (MAIL FROM) from which the messages originate. The determined address is stored in the SDS. The criterion for this anomaly is that the number of message for the given period with the same MAIL FROM address should be greater than the threshold. Based on the level of threshold, suitable alert is generated.
3. Messages having same Size—The point of collection for this anomaly is SMTPI/SMTPIS service. SMTPI/SMTPIS has information about the size of the messages. The size of the message is stored in the SDS. This size denotes the size of the message body and does not include the size of the headers. The criterion for this anomaly is that the number of message for the given period with a same size should be greater than the threshold. Based on the level of threshold, suitable alert is generated.
4. Messages having same Subject—The point of collection for this anomaly is SMTPI/SMTPIS service. SMTPI/SMTPIS has information about the subject line of the message. The subject line information for the message is stored in the SDS. The criterion for this anomaly is that the number of message for the given period with the same subject line should be greater than the threshold. Based on the level of threshold, suitable alert is generated.
5. Messages having same Attachment—The point of collection for this anomaly is the MIME Ripper Queue. The MIME Ripper Queue parses the actual message into the constituent MIME parts and stores the information in the SDS. A part of this information is the attachment file name. The criterion for this anomaly is that the number of message for the given period with same attachment name should be greater than the threshold. Based on the level of threshold, suitable alert is generated.

6. Messages having same Attachment Extension—The point of collection for this anomaly is the MIME Ripper Queue. The MIME Ripper Queue parses the actual message into the constituent MIME parts and stores the information in the SDS. A part of this information is the attachment file extension. The criterion for this anomaly is that the number of message for the given period with same extension should be greater than the threshold. Based on the level of threshold, suitable alert is generated.

7. Messages having Viruses—This anomaly will be detected only if any of the anti-virus queues are enabled. The point of collection for this anomaly is the anti-virus Queue. The anti-virus Queue scans for any viruses on each individual MIME parts of the message. The scan details are stored in the SDS. A part of this information is the virus name. The criterion for this anomaly is that the number of message for the given period detected with viruses should be greater than the threshold. Based on the level of threshold, suitable alert is generated.

8. Messages having same Virus—This anomaly will be detected only if any of the anti-virus queues are enabled. The point of collection for this anomaly is the anti-virus Queue. The anti-virus Queue scans for any viruses on each individual MIME parts of the message. The scan details are entered into the SDS. A part of this information is the virus name. The criterion for this anomaly is that the number of message for the given period detected with same virus should be greater than the threshold. Based on the level of threshold, suitable alert is generated.

The table below depicts the fields in an anomaly table in one preferred embodiment using a relational database model for storing this information in the SDS.

| SI No. | Field Name | Data Type | Remarks |
| --- | --- | --- | --- |
| 1. | anm_type | int | Primary key. Unique identifier for all anomalies. The list is given in next section. |
| 2. | anm_name | varchar | Name of the Anomaly (Tag for the UI to display) |
| 3. | can_display | tinyint | Anomaly is displayable or not in UI. 0 - Do not display 1 - Display |
| 4. | is_enabled | tinyint | Specifies if the anomaly is enabled or not 0 - Disabled 1 - Enabled |
| 5. | anm_period | int | Time in minutes. This time specifies the period for the anomaly check. |

The table below depicts the fields in an anomaly action table in one preferred embodiment using a relational database model for storing this information in the SDS.

| SI No. | Field Name | Data Type | Remarks |
| --- | --- | --- | --- |
| 1. | anm_type | int | Foreign key from anomaly table. |
| 2. | anm_thresh | int | This value specifies the threshold for a particular action to be taken. |
| 3. | alert_type | int | This is foreign key from alert_type table. This value specifies the type of alert to be sent to the alert manager when this anomaly is detected. |

Throughout this application, various publications may have been referenced. The disclosures of these publications in their entireties are hereby incorporated by reference into this application in order to more fully describe the state of the art to which this invention pertains.

The embodiments described above are given as illustrative examples only. It will be readily appreciated by those skilled in the art that many deviations may be made from the specific embodiments disclosed in this specification without departing from the invention. Accordingly, the scope of the invention is to be determined by the claims below rather than being limited to the specifically described embodiments above.

What is claimed is:

1. An application layer security system, the system comprising:
   a) at least one application server system communication interface communicatively coupling the security system to one or more application server systems;
   b) a system data store capable of storing an electronic communication and accumulated data associated with received electronic communications; and
   c) a system processor in communication with the system data store and the at least one application server system communication interface, wherein the system processor comprises one or more processing elements and wherein the system processor:
      i) receives an electronic communication from a remote system and directed to or from a selected application server system;
      ii) applies a plurality of anomaly types of tests to each of the received electronic communication, wherein the plurality of tests combine to evaluate the received electronic communication for a plurality of security risk categories, each of the plurality of tests being operable to measure different behavioral attributes present in at least one of the plurality of security risk categories, the behavioral attributes comprising characteristics of the electronic communication which when taken alone are not determinative of a classification associated with the communication, however, when taken in combination with other behavioral attributes can be used to identify a communication classification;
      iii) stores in the system data store (1) a risk profile associated with the received electronic communication based upon the applied plurality of tests, the risk profile including an array comprising the results of each of the plurality of anomaly types of tests applied to each of the electronic communication; and (2) a queue data store with an index queue associated with each of the plurality of test types;

iv) determines whether an anomaly exists with respect to the received electronic communication based upon the stored risk profile and accumulated data associated with received electronic communications from the system data store, the determination being based on comparing the behavioral attributes associated with the currently received electronic communication with identified behavioral attributes associated previously received and classified communications, the previously received and classified communications comprising both known non-anomalous communications and known anomalous communications; and v) outputs an anomaly indicator signal if an anomaly is determined to exist based upon the comparison of the behavioral attributes of the communication with identified attributes of previously received and classified communications.

2. The system of claim 1, wherein the received electronic communication comprises an e-mail communication, an HTTP communication, an FTP communication, a WAIS communication, a telnet communication or a Gopher communication.

3. The system of claim 2, wherein the received electronic communication is an e-mail communication.

4. The system of claim 1, wherein each of the plurality of tests applied by the system processor comprises intrusion detection, virus detection, spam detection or policy violation detection.

5. The system of claim 1, wherein the system processor applies each of the plurality of tests in a parallel fashion.

6. The system of claim 1, wherein the system processor applies each of the plurality of tests in a sequential fashion.

7. The system of claim 6, wherein the system data store comprises:
 i) a message data store capable of storing an electronic communication, and
 ii) a queue data store capable of storing a plurality of index queues;
 and wherein the system processor applies the plurality of tests in a sequential fashion by:
  1) storing the received electronic communication in the message data store;
  2) assigning a selected index to the stored electronic communication;
  3) executing a plurality of testing engines, wherein each of the testing engines has a test type and has an index queue in the queue data store associated with it, wherein at any given time at least two of the executing testing engines have differing test types, and wherein each of the testing engines:
   (a) monitors its associated index queue for a placed index;
   (b) retrieves the electronic communication associated with the placed index from the message data store; and
   (c) tests the retrieved electronic communication against a set of one or more criteria; and
  4) placing the selected index into the index queue associated with a first testing engine, wherein the first testing engine has a first test type; and
  5) placing the selected index into the index queue associated with a second testing engine, after the first testing engine performs its test upon the stored electronic communication associated with the selected index, wherein the second testing engine has a second test type that differs from the first test type.

8. The system of claim 7, wherein the test type of each executing test engine is intrusion detection, virus detection, spam detection or policy violation detection.

9. The system of claim 1, wherein the system processor applies each of the plurality of tests based upon configuration information stored in the system data store.

10. The system of claim 1, wherein the system processor determines whether an anomaly exists further based upon configuration information stored in the system data store.

11. The system of claim 10, wherein the configuration information comprises anomaly types, anomaly threshold information, anomaly time period information or anomaly response information.

12. The system of claim 1, wherein the system processor further derives one or more anomaly thresholds from the accumulated data associated with received electronic communications in the system data store.

13. The system of claim 1, wherein the system processor determines whether an anomaly exists by:
 1) determining a set of anomaly types of interest;
 2) for each of the anomaly types of interest in the determined set,
  (a) acquiring one or more anomaly thresholds associated with the respective anomaly type based at least in part upon accumulated data associated with received electronic communications from the system data store;
  (b) comparing information in the stored risk profile against at least one of the acquired one or more anomaly thresholds; and
  (c) determining whether an anomaly of the respective anomaly type exists with respect to the received electronic communication based upon the comparison.

14. The system of claim 13, wherein the system processor determines the set of anomaly types of interest by reading configuration information from the system data store.

15. The system of claim 13, wherein the system processor determines the set of anomaly types of interest based upon the received electronic communication.

16. The system of claim 13, wherein the system processor acquires the one or more anomaly thresholds by deriving at least one anomaly threshold from the accumulated data associated with received electronic communications.

17. The system of claim 16, wherein the derivation of the at least one anomaly threshold is further based upon a predetermined time period.

18. The system of claim 13, wherein the system processor acquires at least one anomaly threshold of the one or more anomaly thresholds by reading configuration information from the system data store.

19. The system of claim 1, wherein the anomaly indicator signal comprises a notification conveyed to an administrator.

20. The system of claim 19, wherein the notification comprises an e-mail message, a page, a facsimile, an telephone call, an SMS message, a WAP alert or an SNMP alert.

21. The system of claim 19, wherein the anomaly indicator signal further comprises an anomaly type and wherein the notification conveyed to the administrator comprises the anomaly type.

22. The system of claim 1, wherein the anomaly indicator signal comprises an anomaly type.

23. The system of claim 1, wherein the system is disposed between a firewall system and one or more application server systems.

24. The system of claim 23, further comprising a firewall communication interface communicatively coupling the system to the firewall system, wherein the system processor receives the electronic communication directed to the selected application server system via the firewall communication interface.

25. The system of claim 1, wherein the system processor further forwards the received electronic communication to a destination indicated by the received electronic communication.

26. The system of claim 1, wherein the system processor further aggregates the stored risk profile with the accumulated data associated with received electronic communications and stores aggregated accumulated data in the system data store.

27. The system of claim 1, wherein the system processor further stores the received electronic communication in the system data store.

28. The system of claim 1, wherein the system processor further determines which of the plurality of tests to apply to the received communication.

29. The system of claim 28, wherein the system processor determines the tests to be applied based upon configuration information stored in the system data store.

30. The system of claim 28, wherein the system processor determines the tests to be applied based upon characteristics of the received electronic communication.

31. The system of claim 1, wherein the system processor further provides an interface via which an administrator enters configuration information, receives configuration information from the interface and stores the received configuration information in the system data store.

32. The system of claim 31, wherein the system processor applies the plurality of tests based upon the stored configuration information.

33. The system of claim 31, wherein the system processor determines whether an anomaly exists based upon the stored configuration information.

34. The system of claim 33, wherein the stored configuration information comprises anomaly types, anomaly threshold information, anomaly time period information or anomaly response information.

35. The system of claim 31, wherein the system processor provides the interface to the administrator via a Web server, an e-mail server, an automated voice recognition system or an SMS message server.

36. The system of claim 31, wherein the system processor further populates the interface with default values prior to providing it to the administrator.

37. The system of claim 1, wherein the system processor further takes a corrective measure responsive to the anomaly indicator signal.

38. The system of claim 37, wherein the corrective measure comprises conveying a notification to an administrator, refusing acceptance of further communications from the source of the received communication, quarantine of the received communication, stripping the received communication of identified content, or throttling excessive numbers of incoming connections per second to levels manageable by internal application servers.

39. The system of claim 38, wherein the notification comprises an e-mail message, a page, a facsimile, an telephone call, an SMS message, a WAP alert or SNMP alert.

40. The system of claim 1, wherein the one or more application server systems comprise e-mail server systems, Web server systems, FTP server systems, telnet server systems, GOPHER server systems or WAIS server systems.

41. The system of claim 40, wherein the one or more application server systems are e-mail server systems.

42. A method for enhancing application layer communication security, the method comprising the steps of:

a) receiving an electronic communication directed to or from a selected application server system, wherein the received electronic communication is an application layer communication;

b) applying a plurality of anomaly types of tests to each of the received electronic communication, wherein the plurality of tests evaluate the received electronic communication for a plurality of security risk categories, each of the plurality of tests being operable to measure different behavioral attributes present in at least one of the plurality of security risk categories, the behavioral attributes comprising characteristics which when taken alone are not determinative of a classification associated with the communication, however, when taken in combination with other behavioral attributes can be used to identify a communication classification, thereby generating at least one risk profile associated with the electronic communication, and storing in a system data store (1) a risk profile associated with the received electronic communication based upon the applied plurality of tests, the risk profile including an array comprising the results of each of the plurality of anomaly types of tests applied to each of the electronic communication and (2) a queue data store with an index queue associated with each of the plurality of test types;

c) determining whether an anomaly exists with respect to the received electronic communication based upon a comparison of the behavioral attributes associated with the currently received electronic communication and identified attributes associated with previously received and classified communications, the previously received and classified communications comprising both known non-anomalous communications and known anomalous communications; and d) outputting an anomaly indicator signal if an anomaly is determined to exist based upon the comparison of the behavioral attributes of the communication with identified attributes of previously received and classified communications.

43. The method of claim 42, wherein the received electronic communication comprises an e-mail communication, an HTTP communication, an FTP communication, a WAIS communication, a telnet communication or a Gopher communication.

44. The method of claim 43, wherein the received electronic communication is an e-mail communication.

45. The method of claim 42, wherein the step of applying plurality of tests comprises applying one or more of an intrusion detection test, a virus detection test, a spam detection test or a policy violation test.

46. The method of claim 42, wherein the step of applying plurality of tests comprises sequentially applying a plurality of tests.

47. The method of claim 46, wherein the step of applying plurality of tests comprises for each of the plurality of tests performing the steps of:
  i) selecting a test to perform,
  ii) performing the selected test on the received electronic communication, and
  iii) outputting a risk profile based upon the performed test.

48. The method of claim 47, and further comprising the step of receiving configuration information and wherein the step of selecting a test comprises selecting a test based upon the received configuration information.

49. The method of claim 47, wherein the step of selecting a test comprises selecting a test based upon a type associated with the received electronic communication.

50. The method of claim 42, and further comprising the step of receiving configuration information and wherein the step of determining whether an anomaly exists is further based upon the received configuration information.

51. The method of claim 50, wherein the received configuration information comprises anomaly types or anomaly response information.

52. The method of claim 51, and further comprising the step of receiving accumulated data associated with received communication and wherein the step of determining whether an anomaly exists comprises deriving anomaly threshold information from the received accumulated data.

53. The method of claim 51, wherein the received configuration information further comprises anomaly threshold information or anomaly time period information.

54. The method of claim 42, and further comprising the step of receiving accumulated data associated with received communication and wherein the step of determining whether an anomaly exists is further based upon the received accumulated data associated with received communications.

55. The method of claim 42, and further comprising the step of taking a corrective measure responsive to the anomaly indicator signal.

56. Computer readable storage media storing instructions that upon execution by a system processor cause the system processor to provide application layer security, the media having stored instruction that cause the system processor to perform the steps comprising of:
　a) receiving an electronic communication directed to or from a selected application server system, wherein the received electronic communication is an application layer communication;
　b) applying a plurality of anomaly types of tests to each of the received electronic communication, wherein the plurality of tests evaluate the received electronic communication for a plurality of security risk categories, each of the plurality of tests being operable to measure different behavioral attributes present in at least one of the plurality of security risk categories, the behavioral attributes comprising characteristics which when taken alone are not determinative of a classification associated with the communication, however, when taken in combination with other behavioral attributes can be used to identify a communication classification, thereby generating at least one risk profile associated with the electronic communication, and storing in a system data store (1) the risk profile associated with the received electronic communication based upon the applied plurality of tests, the risk profile including an array comprising the results of each of the plurality of anomaly types of tests applied to each of the electronic communication and (2) a queue data store with an index queue associated with each of the plurality of test types;
　c) determining whether an anomaly exists with respect to the received electronic communication based upon a comparison of the behavioral attributes associated with the currently received electronic communication and identified attributes associated with previously received and classified communications, the previously received and classified communications comprising both known non-anomalous communications and known anomalous communications; and
　d) outputting an anomaly indicator signal if an anomaly is determined to exist based upon the comparison of the behavioral attributes of the communication with identified attributes of previously received and classified communications.

57. The media of claim 56, wherein the instructions causing the system processor to receive the electronic communication comprise instructions causing the system processor to receive an e-mail communication, an HTTP communication, an FTP communication, a WAIS communication, a telnet communication or a Gopher communication.

58. The media of claim 56, wherein the instructions causing the system processor to receive the electronic communication comprise instructions causing the system processor to receive an e-mail communication.

59. The media of claim 56, wherein the instructions causing the system processor to apply the plurality of tests comprise instructions causing the system processor to apply one or more of an intrusion detection test, a virus detection test, a spam detection test or a policy violation test.

60. The media of claim 56, wherein the instructions causing the system processor to apply a plurality of tests comprise instructions causing the system processor to:
　i) select a test to perform;
　ii) perform the selected test on the received electronic communication; and
　iii) outputting a risk profile based upon the performed test.

61. The media of claim 56, wherein the instructions causing the system processor to determine whether an anomaly exists comprises instruction causing the system processor to:
　i) determine a set of anomaly types of interest;
　ii) for each of the anomaly types of interest in the determined set,
　　1) acquire one or more anomaly thresholds associated with the respective anomaly type;
　　2) compare information in the at least one risk profile against at least one of the acquired one or more anomaly thresholds; and
　　3) determine whether an anomaly of the respective anomaly type exists with respect to the received electronic communication based upon the comparison.

62. The media of claim 56, wherein the instructions causing the system processor to output the anomaly indicator signal comprise instructions causing the system to convey a notification to an administrator, wherein the notification comprises an e-mail message, a page, a facsimile, an telephone call, an SMS message, a WAP alert or an SNMP alert.

63. An application layer security system, the system comprising:
　a) receiving means for receiving an application layer electronic communication;
　b) storing means for storing an electronic communication and accumulated data associated with received electronic communications;
　c) assessment means for applying a plurality of anomaly types of tests to each of the received electronic communication, wherein the plurality of tests evaluate the received electronic communication for a plurality of security risk categories each of the plurality of tests being operable to measure different behavioral attributes present in a particular security risk category from among the plurality of security risk categories, the behavioral attributes comprising characteristics which when taken alone are not determinative of a classification associated with the communication, however, when taken in combination with other behavioral attributes can be used to identify a communication classification, and for storing a risk profile in the storing means, wherein the risk profile was generated from applying the plurality of tests to the received electronic communication, and thereby storing in a system data store (1) the risk profile associated with the received electronic communication based upon the applied plurality of tests, the risk profile including an array comprising the results of each of the plurality of anomaly types of tests applied to each of the electronic communication and (2) a queue data store with an index queue associated with each of the plurality of test types;

d) anomaly determining means for determining whether an anomaly exists with respect to the received communication based upon a comparison of the behavioral attributes associated with the currently received electronic communication and identified attributes associated with previously received and classified communications, the previously received and classified communications comprising both known non-anomalous communications and known anomalous communications; and e) output means for outputting an anomaly indicator signal if an anomaly was determined to exist by the anomaly determining means based upon the comparison of the behavioral attributes of the communication with identified attributes of previously received and classified communications.

64. An application layer security system, the system comprising:

a) at least one application server system communication interface communicatively coupling the security system to one or more application server systems;

b) a system data store capable of storing an electronic communication and accumulated data associated with received electronic communications; and c) a system processor in communication with the system data store and the at least one application server system communication interface, wherein the system processor comprises one or more processing elements and wherein the system processor:

i) receives an electronic communication directed to or from a selected application server system;

ii) applies a plurality of anomaly types of tests to each of the received electronic communication, wherein the plurality of tests combine to evaluate the received electronic communication for a plurality of security risk categories, each of the plurality of tests being operable to measure different behavioral attributes present in at least one of the plurality of security risk categories, the behavioral attributes comprising characteristics of the electronic communication which when taken alone are not determinative of a classification associated with the communication, however, when taken in combination with other behavioral attributes can be used to identify a communication classification;

iii) stores in the system data store (1) a risk profile associated with the received electronic communication based upon the applied plurality of tests, the risk profile including an array comprising the results of each of the plurality of anomaly types of tests applied to each of the electronic communication; and (2) a queue data store having a plurality of index queue associated with the plurality of test types;

iv) determines whether an anomaly exists with respect to the received electronic communication based upon the stored risk profile and accumulated data associated with received electronic communications from the system data store; and v) outputs an anomaly indicator signal if an anomaly is determined to exist;

wherein the system data store comprises:

i) a message data store capable of storing an electronic communication, and ii) the queue data store capable of storing the plurality of index queues;

and wherein the system processor applies the plurality of tests in a sequential fashion by:

1) storing the received electronic communication in the message data store;

2) assigning a selected index to the stored electronic communication;

3) executing a plurality of testing engines, wherein each of the testing engines has a test type and has an index queue in the queue data store associated with it, wherein at any given time at least two of the executing testing engines have differing test types, and wherein each of the testing engines:

(a) monitors its associated index queue for a placed index;

(b) retrieves the electronic communication associated with the placed index from the message data store; and (c) tests the retrieved electronic communication against a set of one or more criteria; and 4) placing the selected index into the index queue associated with a first testing engine, wherein the first testing engine has a first test type; and 5) placing the selected index into the index queue associated with a second testing engine, after the first testing engine performs its test upon the stored electronic communication associated with the selected index, wherein the second testing engine has a second test type that differs from the first test type.

* * * * *